United States Patent
Kang et al.

(10) Patent No.: US 11,026,084 B2
(45) Date of Patent: Jun. 1, 2021

(54) MOBILE NETWORK AUTHENTICATION METHOD, TERMINAL DEVICE, SERVER, AND NETWORK AUTHENTICATION ENTITY

(71) Applicant: Huawei Technologies Co., Ltd., Shenzhen (CN)

(72) Inventors: Xin Kang, Singapore (SG); Haiguang Wang, Singapore (SG); Yanjiang Yang, Shenzhen (CN); Zhongding Lei, Singapore (SG)

(73) Assignee: Huawei Technologies Co., Ltd., Shenzhen (CN)

( * ) Notice: Subject to any disclaimer, the term of this patent is extended or adjusted under 35 U.S.C. 154(b) by 145 days.

(21) Appl. No.: 16/297,231

(22) Filed: Mar. 8, 2019

(65) Prior Publication Data
US 2019/0208417 A1 Jul. 4, 2019

Related U.S. Application Data

(63) Continuation of application No. PCT/CN2017/092429, filed on Jul. 11, 2017.

(30) Foreign Application Priority Data

Sep. 9, 2016 (CN) .......................... 201610814492.7

(51) Int. Cl.
*H04W 12/0433* (2021.01)
*H04L 29/06* (2006.01)
(Continued)

(52) U.S. Cl.
CPC ......... *H04W 12/0433* (2021.01); *H04L 29/06* (2013.01); *H04L 63/062* (2013.01);
(Continued)

(58) Field of Classification Search
CPC ......... H04W 12/0433; H04W 12/0431; H04W 12/069; H04W 12/03; H04W 12/35;
(Continued)

(56) References Cited

U.S. PATENT DOCUMENTS 7,861,078 B2 * 12/2010 Funk ..................... H04L 9/0863
713/155
9,203,615 B2 12/2015 Papillon et al.
(Continued)

FOREIGN PATENT DOCUMENTS

| CN | 101052033 A | 10/2007 |
| CN | 101273572 A | 9/2008 |
| EP | 3038393 A1 | 6/2016 |

OTHER PUBLICATIONS

"Remote Provisioning for IoT devices through a Companion UE,"3GPP TSG SA WG3 (Security) Meeting #84, S3-161004, revision of S3-16abcd, Chennai, India, pp. 1-5, 3rd Generation Partnership Project—Valbonne, France (Jul. 25-29, 2016).
(Continued)

*Primary Examiner* — Ashokkumar B Patel
*Assistant Examiner* — William B Jones
(74) *Attorney, Agent, or Firm* — Leydig, Voit & Mayer, Ltd.

(57) ABSTRACT

This application discloses a mobile network authentication method, a terminal device, a server, and a network authentication entity. The method includes: receiving, by a first terminal device, a DH public key and a first ID that are sent by at least one second terminal device; sending a first message to a server, where the first message includes a DH public key of each second terminal device of the at least one second terminal device and a first ID of the second terminal device; receiving a second message sent by the server, where the second message includes a DH public key of the server and a second ID of the second terminal device that is generated by the server; and sending, by the first terminal device, the second ID of the second terminal device and the DH public key of the server to the second terminal device.

10 Claims, 15 Drawing Sheets

(51) Int. Cl.
*H04W 12/03* (2021.01)
*H04W 12/30* (2021.01)
*H04W 12/069* (2021.01)
*H04W 12/0431* (2021.01)
*H04W 80/02* (2009.01)

(52) U.S. Cl.
CPC ......... *H04L 63/0869* (2013.01); *H04W 12/03* (2021.01); *H04W 12/0431* (2021.01); *H04W 12/069* (2021.01); *H04W 12/35* (2021.01); *H04W 80/02* (2013.01)

(58) Field of Classification Search
CPC ...... H04W 80/02; H04L 29/06; H04L 63/062; H04L 63/0869
See application file for complete search history.

(56) References Cited

U.S. PATENT DOCUMENTS

| | | | |
|---|---|---|---|
| 2013/0012168 A1 | 1/2013 | Rajadurai et al. | |
| 2013/0067552 A1* | 3/2013 | Hawkes | H04W 12/0431 726/7 |
| 2015/0089618 A1* | 3/2015 | Ferchichi | G06F 21/41 726/8 |
| 2015/0319149 A1* | 11/2015 | Alshammari | H04L 9/0869 713/171 |
| 2016/0134419 A1 | 5/2016 | Smith et al. | |
| 2016/0149908 A1 | 5/2016 | Unagami et al. | |
| 2016/0234020 A1 | 8/2016 | Nix | |

OTHER PUBLICATIONS

Gentry et al., "Identity-Based Aggregate Signatures," In Proc. Public Key Cryptography—PKC 2006, pp. 257-273., pp. 1-17, LNCS 3958 (2006).
"Secure Mechanism to Achieve Remote Credential Provisioning for IoT devices," 3GPP TSG SA WG3 (Security) Meeting #84 S3-161000, Chennai, India, pp. 1-4, 3rd Generation Partnership Project—Valbonne, France (Jul. 25-29, 2016).
Bagherzandi et al., "Identity-Based Aggregate and Multi-Signature Schemes based on RSA," Proc. Public Key Cryptography—PKC 2010, pp. 480-498, pp. 1-19, LNCS 6056 (2010).
"Remote Provisioning for IoT devices without Initial Credentials," 3GPP TSG SA WG3 (Security) Meeting #85 S3-161726, revision of S3-13abcd, Santa Cruz de Tenerife (Spain), pp. 1-2, 3rd Generation Partnership Project—Valbonne, France (Nov. 7-11, 2016).
"3rd Generation Partnership Project; Technical Specification Group Services and System Aspects; Feasibility Study on New Services and Markets Technology Enablers for Massive Internet of Things; Stage 1 (Release 14)," 3GPP TR 22.861 V14.0.0, pp. 1-28, 3rd Generation Partnership Project—Valbonne, France (Jun. 2016).
"Group Provisioning for IoT devices via a Companion UE," 3GPP TSG SA WG3 (Security) Meeting #85 S3-161785, revision of S3-13abcd, Santa Cruz de Tenerife (Spain), pp. 1-3, 3rd Generation Partnership Project—Valbonne, France (Nov. 7-11, 2016).
"3rd Generation Partnership Project; Technical Specification Group Services and System Aspects; 3GPP System Architecture Evolution (SAE); Security architecture (Release 13)," 3GPP TS 33.401 V13.3.0, pp. 1-148, 3rd Generation Partnership Project—Valbonne, France (Jun. 2016).
"3rd Generation Partnership Project; Technical Specification Group Services and System Aspects; Feasibility Study on New Services and Markets Technology Enablers; Stage 1 (Release 14)," 3GPP TR 22.891 V14.1.0, pp. 1-95, 3rd Generation Partnership Project—Valbonne, France (Jun. 2016).
3rd Generation Partnership Project; Technical Specification Group Services and System Aspects; Study on the security aspects of the next generation system (Release 14), 3GPP TR 33.899 V0.4.1, pp. 1-156, 3rd Generation Partnership Project—Valbonne, France (Aug. 2016).
"Remote Provisioning for IoT devices through a Companion UE," 3GPP TSG SA WG3 (Security) Meeting #84, Chennai, India, S3-161004, pp. 1-5, 3rd Generation Partnership Project—Valbonne, France (Jul. 25-29, 2016).
CN/201610814492.7, Office Action/Search Report, dated Dec. 31, 2020.

\* cited by examiner $K=A^b \bmod p = (g^a \bmod p)^b \bmod p = g^{ab} \bmod p = (g^b \bmod p)^a = B^a \bmod p$

MOBILE NETWORK AUTHENTICATION METHOD, TERMINAL DEVICE, SERVER, AND NETWORK AUTHENTICATION ENTITY

CROSS-REFERENCE TO RELATED APPLICATIONS

This application is a continuation of International Application No. PCT/CN2017/092429, filed on Jul. 11, 2017, which claims priority to Chinese Patent Application No. 201610814492.7, filed on Sep. 9, 2016. The disclosures of the aforementioned applications are hereby incorporated by reference in their entireties.

TECHNICAL FIELD

This application relates to the communications field, and in particular, to a mobile network authentication method, a terminal device, a server, and a network authentication entity in the communications field.

BACKGROUND

The Internet of Things (IoT) is an important application scenario of a next-generation mobile communications network 5G. The Internet of Things is cost-sensitive and has higher security and stability requirements, so it is difficult for a conventional subscriber identity module (SIM) to satisfy a requirement of an Internet of Things device. An embedded subscriber identity module (eSIM) having a remote credential configuration function emerges, may be directly soldered into an Internet of Things device to ensure stability, and may remotely download a credential of an operator when a terminal device is activated. Currently, in all remote configuration technologies and specifications of the eSIM, the terminal device is required to have an initial credential upon delivery. When being activated to attach a network, the terminal device remotely configures a server using this initial provisional credential and the credential of the operator to establish a secure channel, and downloads a credential provided by the operator to facilitate subsequent network attach. However, in an Internet of Things scenario, it is quite likely that no initial credential is configured for the Internet of Things device upon delivery. Existing technologies and specifications cannot satisfy such a requirement of remotely downloading a credential of an operator by an Internet of Things device that does not hold a credential pre-issued by the operator.

SUMMARY

In view of this, embodiments of this application provide a mobile network authentication method, a terminal device, a server, and a network authentication entity, to enable a terminal device not having a credential pre-issued by an operator network to obtain a credential of the operator network by using a terminal device holding a credential.

According to a first aspect, a mobile network authentication method is provided. The method includes:

receiving, by a first terminal device, a Diffie-Hellman (DH) public key and a first identity (ID) that are sent by at least one second terminal device, where the first terminal device is a device holding a shared key, and the at least one second terminal device is a device not holding a shared key; sending, by the first terminal device, a first message to a server, where the first message includes a DH public key of each second terminal device of the at least one second terminal device and a first ID of the second terminal device; receiving, by the first terminal device, a second message that is sent by the server based on the first message, where the second message includes a DH public key of the server and a second ID of the second terminal device that is generated by the server for the second terminal device, and the second ID is used to identify a subscription user; and sending, by the first terminal device, the second ID of the second terminal device and the DH public key of the server to the second terminal device, so that the second terminal device determines, according to the second ID of the second terminal device and the DH public key of the server, a first shared key of the second terminal device and the second ID of the second terminal device that are used for authentication with the server.

Therefore, a terminal device can establish, based on a credential of an operator held by the terminal device, a channel for key negotiation between a terminal device not holding a credential pre-issued by the operator and the server, so that the terminal device not having a credential pre-issued by the operator can also obtain, from the server, a shared key used for authentication with an operator network, thereby accessing the network.

Optionally, the first message further includes indication information, and the indication information is used to indicate that the first message is used to request the shared key of the second terminal device and the second ID of the second terminal device for the second terminal device.

For example, the indication information may be, for example, a flag bit, and the flag bit may be indicated, by using different values, as a credential that one second terminal device requests an operator to issue, or a credential that a plurality of second terminal devices request an operator to issue. When the first terminal device receives the first ID of the second terminal device and the DH public key of the second terminal device that are sent by the second terminal device, the first terminal device may add the indication information to the first message sent to the server. The second ID may be, for example, an IMSI number allocated by the operator to the subscription user.

Optionally, before the sending, by the first terminal device, a first message to a server, the method further includes: generating, by the first terminal device, a message authentication code (MAC) of the first message for the first message according to a second shared key, where the second shared key is used for authentication between the first terminal device and the server, where the sending, by the first terminal device, a first message to a server includes: sending, by the first terminal device, the first message and the MAC of the first message to the server.

Optionally, the receiving, by the first terminal device, a second message that is sent by the server based on the first message includes: receiving, by the first terminal device, the second message sent by the server, and a MAC of the second message generated by the server for the second message according to the second shared key, where the sending, by the first terminal device, the second ID of the second terminal device and the DH public key of the server to the second terminal device includes: verifying, by the first terminal device, the MAC of the second message according to the second shared key; and if the first terminal device verifies the MAC of the second message, sending, by the first terminal device, the second ID of the second terminal device and the DH public key of the server to the second terminal device.

In this way, in a process of information exchange between the server and a terminal device, message verification performed on a message can ensure that a source of the message is reliable and the message is not tampered in a transmission process, thereby improving security of a key exchange process.

Optionally, the receiving, by the first terminal device, a second message that is sent by the server based on the first message includes: receiving, by the first terminal device from the server, the second message, a signature message of the second terminal device obtained after the server signs the second ID of the second terminal device and the DH public key of the server, and verification information of the second terminal device that is corresponding to the signature message of the second terminal device, where the sending, by the first terminal device, the second message to the second terminal device includes: sending, by the first terminal device, the second ID of the second terminal device and the DH public key of the server, the signature message of the second terminal device, and the verification information of the second terminal device to the second terminal device.

Optionally, the verification message includes a certificate of the server or an ID of the server.

If the server uses a certificate-based key mechanism, the verification information may be the certificate of the server, that is, a certificate corresponding to a private key used by the server to encrypt the second message, so that the second terminal device can verify the signature according to the certificate; or if the server uses an identity-based key mechanism, the verification information may be the ID of the server, so that the second terminal device can verify the signature according to the ID of the server.

In this way, the DH public key of the server that is sent to a terminal device not holding a credential and the identity that is used to identify the subscription user and that is generated for the terminal device are signed by using the server. Therefore, security of a key exchange process is improved. Even if the terminal device is cracked or controlled, a man-in-the-middle attack cannot be initiated.

Optionally, before the sending, by the first terminal device, a first message to a server, the method further includes: encrypting, by the first terminal device, the DH public key of the second terminal device and the first ID of the second terminal device according to the second shared key, where the DH public key of the second terminal device and the first ID of the second terminal device that are in the first message sent by the first terminal device to the server are encrypted by the first terminal device.

Optionally, the second ID of the second terminal device and the DH public key of the server that are in the second message received by the first terminal device from the server are encrypted by the server, where before the sending, by the first terminal device, the second ID of the second terminal device and the DH public key of the server to the second terminal device, the method further includes: decrypting, by the first terminal device, the encrypted second ID of the second terminal device and the encrypted DH public key of the server according to the second shared key; and the sending, by the first terminal device, the second ID of the second terminal device and the DH public key of the server to the second terminal device includes: sending, by the first terminal device, the decrypted second ID of the second terminal device and the decrypted DH public key of the server to the second terminal device.

In this way, in a process of information exchange between the server and a terminal device, encryption performed on a message improves security of a key exchange process between the server and the terminal device.

Optionally, the server includes a home subscriber server (HSS).

According to a second aspect, a terminal device is provided. The terminal device is a first terminal device, the terminal device may be configured to perform each process performed by the first terminal device in the mobile network authentication method according to the first aspect and various implementations, the first terminal device is a device holding a shared key, and the first terminal device includes:

a receiving module, configured to receive a Diffie-Hellman (DH) public key and a first identity (ID) that are sent by at least one second terminal device, where the at least one second terminal device is a device not holding a shared key; and a sending module, configured to send a first message to a server, where the first message includes a DH public key of each second terminal device of the at least one second terminal device and a first ID of the second terminal device, where the receiving module is further configured to receive a second message that is sent by the server based on the first message, where the second message includes a DH public key of the server and a second ID of the second terminal device that is generated by the server for the second terminal device, and the second ID is used to identify a subscription user; and the sending module is further configured to send the second ID of the second terminal device and the DH public key of the server to the second terminal device, so that the second terminal device determines, according to the second ID of the second terminal device and the DH public key of the server, a first shared key of the second terminal device and the second ID of the second terminal device that are used for authentication with the server.

According to a third aspect, another terminal device is provided. The terminal device is a first terminal device, the first terminal device is a device holding a shared key, and the first terminal device includes a processor, a receiver, a transmitter, and a memory. The memory is configured to store an instruction, the processor is configured to execute the instruction stored in the memory, and when the processor executes the instruction stored in the memory, the execution enables the processor to perform the method according to the first aspect or any possible implementation of the first aspect.

The receiver is configured to receive a Diffie-Hellman (DH) public key and a first identity (ID) that are sent by at least one second terminal device, where the at least one second terminal device is a device not holding a shared key; and the transmitter is configured to send a first message to a server, where the first message includes a DH public key of each second terminal device of the at least one second terminal device and a first ID of the second terminal device, where the receiver is further configured to receive a second message that is sent by the server based on the first message, where the second message includes a DH public key of the server and a second ID of the second terminal device that is generated by the server for the second terminal device, and the second ID is used to identify a subscription user; and the transmitter is further configured to send the second ID of the second terminal device and the DH public key of the server to the second terminal device, so that the second terminal device determines, according to the second ID of the second terminal device and the DH public key of the server, a first shared key of the second terminal device and the second ID of the second terminal device that are used for authentication with the server.

According to a fourth aspect, a mobile network authentication method is provided. The method includes:

determining, by a second terminal device, a Diffie-Hellman (DH) public key of the second terminal device according to a first random number, where the second terminal device is a device not holding a shared key; sending, by the second terminal device, a first message to a first terminal device, where the first message includes the DH public key of the second terminal device and a first identity (ID) of the second terminal device, and the first terminal device is a device holding a shared key; receiving, by the second terminal device, a second message that is sent by the first terminal device based on the first message, where the second message includes a DH public key of a server, and a second ID that is generated by the server for the second terminal device, and the second ID is used to identify a subscription user; determining, by the second terminal device, a first shared key according to the first random number and the DH public key of the server; and performing, by the second terminal device, mutual authentication with the server according to the first shared key and the second ID.

Therefore, a terminal device not having a credential pre-issued by an operator may obtain, from the server in a DH key exchange manner by using another terminal device holding a credential, a shared key used for authentication with an operator network, thereby accessing the network.

For example, the second terminal device may generate a random number such as RAND 1. The second terminal device calculates a DH public key, recorded as A herein, of the second terminal device according to RAND 1, where $A=g^{RAND\ 1}$ mod p, and sends the public key A to the server by using the first terminal device. Similarly, the server may calculate a DH public key, recorded as B herein, of the server according to a random number RAND 2, where $B=g^{RAND\ 2}$ mod p, and send the public key B to the second terminal device. After receiving, from the first terminal device, the DH public key $B=g^{RAND\ 2}$ mod p of the server, the second terminal device can determine, according to the random number RAND 1 of the second terminal device and the public key B, a shared key KD used for authentication with the server, where $K_D=A^{RAND\ 2}$ mod p.

It may be learned that, the shared key $K_D=A^{RAND\ 2}$ mod p determined by the server is the same as the shared key $K_D=B^{RAND\ 1}$ mod p determined by the second terminal device. To be specific, $K=A^b$ mod $p=(g^a$ mod $p)^b$ mod $p=g^{ab}$ mod $p=(g^b$ mod $p)^a=B^a$ mod p. Moreover, the shared key is learned by only the second terminal device and the server, and is not learned by the first terminal device. Therefore, the second terminal device may perform authentication with the server by using the shared key and the second ID of the second terminal device, thereby accessing the operator network.

Optionally, the receiving, by the second terminal device, a second message that is sent by the first terminal device includes: receiving, by the second terminal device, the second message, a signature message obtained after the server signs the second message, and verification information corresponding to the signature message, where the second message, the signature message, and the verification information are sent by the first terminal device; and the determining, by the second terminal device, a first shared key according to the first random number and the DH public key of the server includes: verifying, by the second terminal device, the second message according to the second message, the signature message, and the verification information; and if the second terminal device verifies the second message, determining, by the second terminal device, the first shared key according to the first random number and the DH public key of the server.

Optionally, the verification message includes a certificate of the server or an ID of the server.

If the server uses a certificate-based key mechanism, the verification information may be the certificate of the server, that is, a certificate corresponding to a private key used by the server to encrypt the second message, so that the second terminal device can verify the signature according to the certificate; or if the server uses an identity-based key mechanism, the verification information may be the ID of the server, so that the second terminal device can verify the signature according to the ID of the server.

Optionally, the method further includes: generating, by the second terminal device, a message authentication code (MAC) of the second ID for the second ID according to the first shared key; sending, by the second terminal device, the second ID and the MAC of the second ID to the server; receiving, by the second terminal device, a provision complete message that is sent by the server based on the second ID and the MAC of the second ID, and a MAC of the provision complete message that is generated by the server for the provision complete message; and verifying, by the second terminal device, the MAC of the provision complete message according to the first shared key, where the performing, by the second terminal device, mutual authentication with the server according to the first shared key and the second ID includes: if the second terminal device verifies the MAC of the provision complete message, performing, by the second terminal device, mutual authentication with the server according to the first shared key and the second ID.

In this way, the second terminal device can ensure that the first shared key determined by the server is consistent with the first shared key determined by the second terminal device.

According to a fifth aspect, a terminal device is provided. The terminal device is a second terminal device, the terminal device may be configured to perform each process performed by the second terminal device in the mobile network authentication method according to the fourth aspect and various implementations, the second terminal device is a device not holding a shared key, and the second terminal device includes:

a determining module, configured to determine a Diffie-Hellman (DH) public key of the second terminal device according to a first random number; a sending module, configured to send a first message to a first terminal device, where the first message includes the DH public key of the second terminal device and a first identity (ID) of the second terminal device, and the first terminal device is a device holding a shared key; a receiving module, configured to receive a second message that is sent by the first terminal device based on the first message, where the second message includes a DH public key of a server, and a second ID that is generated by the server for the second terminal device, and the second ID is used to identify a subscription user, where the determining module is further configured to determine a first shared key according to the first random number and the DH public key of the server; and an authentication module, configured to perform mutual authentication with the server according to the first shared key and the second ID.

According to a sixth aspect, another terminal device is provided. The terminal device is a second terminal device, the second terminal device is a device not holding a shared key, and the second terminal device includes a processor, a receiver, a transmitter, and a memory. The memory is configured to store an instruction, the processor is configured to execute the instruction stored in the memory, and when the processor executes the instruction stored in the memory, the execution enables the processor to perform the method according to the fourth aspect or any possible implementation of the fourth aspect.

The processor is configured to determine a Diffie-Hellman (DH) public key of the second terminal device according to a first random number; the transmitter is configured to send a first message to a first terminal device, where the first message includes the DH public key of the second terminal device and a first identity (ID) of the second terminal device, and the first terminal device is a device holding a shared key; and the receiver is configured to receive a second message that is sent by the first terminal device based on the first message, where the second message includes a DH public key of a server, and a second ID that is generated by the server for the second terminal device, and the second ID is used to identify a subscription user, where the processor is further configured to determine a first shared key according to the first random number and the DH public key of the server; and the processor is further configured to perform mutual authentication with the server according to the first shared key and the second ID.

According to a seventh aspect, a mobile network authentication method is provided. The method includes:
receiving, by a server, a first message sent by a first terminal device, where the first message includes a DH public key of each second terminal device of at least one second terminal device and a first ID of the second terminal device that are received by the first terminal device from the second terminal device, the first terminal device is a device holding a shared key, and the at least one second terminal device is a device not holding a shared key; determining, by the server, a DH public key of the server according to a second random number, and generating a second ID of the second terminal device for the second terminal device, where the second ID is used to identify a subscription user; determining, by the server according to the DH public key of the second terminal device and the second random number, a first shared key of the second terminal device used for authentication with the second terminal device; and sending, by the server, a second message to the first terminal device, where the second message includes the DH public key of the server and the second ID of the second terminal device.

Therefore, the server can provide, for a terminal device not having a credential pre-issued by an operator and in a DH key exchange manner by using a terminal device holding a credential, a shared key used for authentication with an operator network, thereby enabling the terminal device not having a credential pre-issued by the operator to access the network.

For example, the second terminal device may generate a random number such as RAND 1. The second terminal device calculates a DH public key, recorded as A herein, of the second terminal device according to RAND 1, where $A=g^{RAND\ 1}$ mod p. The second terminal device further sends the DH public key A to the server by using the first terminal device. Similarly, the server may calculate a DH public key, recorded as B herein, of the server according to a random number RAND 2, where $B=g^{RAND\ 2}$ mod p. The server further sends the DH public key B to the second terminal device by using the first terminal device. After receiving, from the first terminal device, the DH public key $A=g^{RAND\ 1}$ mod p of the second terminal device, the server can determine, according to the random number RAND 2 of the server and the public key A, a shared key $K_D$ used for authentication with the second terminal device, where $K_D=A^{RAND\ 2}$ mod p.

It may be learned that, the shared key $K_D=A^{RAND\ 2}$ mod p determined by the server is the same as the shared key $K_D=B^{RAND\ 1}$ mod p determined by the second terminal device. To be specific, $K=A^b$ mod $p=(g^a$ mod $p)^b$ mod $p=g^{ab}$ mod $p=(g^b$ mod $p)^a=B^a$ mod p. Moreover, the shared key is learned by only the second terminal device and the server, and is not learned by the first terminal device. Therefore, the second terminal device may perform authentication between the second terminal device and the server by using the shared key and the second ID of the second terminal device, thereby accessing the operator network.

Optionally, the method includes: the first message further includes indication information, and the indication information is used to indicate that the first message is used to request the shared key of the second terminal device and the second ID of the second terminal device for the second terminal device.

For example, the indication information may be, for example, a flag bit, and the flag bit may be indicated, by using different values, as a credential that one second terminal device requests an operator to issue, or a credential that a plurality of second terminal devices request an operator to issue. When the first terminal device receives the first ID of the second terminal device and the DH public key of the second terminal device that are sent by the second terminal device, the first terminal device may add the indication information to the first message sent to the server. The second ID may be, for example, an IMSI number allocated by the operator to the subscription user.

Optionally, the receiving, by a server, a first message sent by a first terminal device includes: receiving, by the server, the first message sent by the first terminal device, and a message authentication code (MAC) of the first message generated by the first terminal device for the first message according to a second shared key, where the second shared key is used for authentication between the first terminal device and the server, where the determining, by the server according to the second random number and the DH public key of the server, a first shared key of the second terminal device used for authentication with the second terminal device includes: verifying, by the server, the MAC of the first message according to the second shared key; and if the server verifies the MAC of the first message, determining, by the server according to the second random number and the DH public key of the server, the first shared key of the second terminal device used for authentication with the second terminal device.

Optionally, before the sending, by the server, a second message to the first terminal device, the method further includes: generating, by the server, a MAC of the second message for the second message according to the second shared key, where the sending, by the server, a second message to the first terminal device includes: sending, by the server, the second message and the MAC of the second message to the first terminal device.

Optionally, before the sending, by the server, a second message to the first terminal device, the method further includes: signing, by the server, the second ID of the second terminal device and the DH public key of the server, where the sending, by the server, a second message to the first terminal device includes: sending, by the server to the first terminal device, the second message, a signature message of the second terminal device obtained after the server signs the second ID of the second terminal device and the DH public key of the server, and a verification message of the second terminal device that is corresponding to the signature message of the second terminal device.

In this way, the server may sign, by using an asymmetric key mechanism (for example, a certificate-based cryptography or an identity-based cryptography), the to-be-sent DH public key of the server and the identity that is used to identify the subscription user and that is generated for a terminal device. Therefore, security of a key exchange process is improved. Even if the terminal device is cracked or controlled, a man-in-the-middle attack cannot be initiated.

Optionally, the verification message includes a certificate of the server or an ID of the server.

If the server uses a certificate-based key mechanism, the verification information may be the certificate of the server, that is, a certificate corresponding to a private key used by the server to encrypt the second message, so that the second terminal device can verify the signature according to the certificate; or if the server uses an identity-based key mechanism, the verification information may be the ID of the server, so that the second terminal device can verify the signature according to the ID of the server.

Optionally, the DH public key of the second terminal device and the first ID of the second terminal device that are in the first message received by the server from the first terminal device are encrypted by the first terminal device, where before the determining, by the server according to the DH public key of the second terminal device and the second random number, a first shared key of the second terminal device used for authentication with the second terminal device, the method further includes: decrypting, by the server, the encrypted DH public key of the second terminal device and the encrypted first ID of the second terminal device according to the second shared key; and the determining, by the server according to the DH public key of the second terminal device and the second random number, a first shared key of the second terminal device used for authentication with the second terminal device includes: determining, by the server according to the decrypted DH public key of the second terminal device and the second random number, the first shared key of the second terminal device used for authentication with the second terminal device.

Optionally, before the sending, by the server, a second message to the first terminal device, the method further includes: encrypting, by the server, the DH public key of the server and the second ID of the second terminal device according to the second shared key, where the DH public key of the server and the second ID of the second terminal device that are in the second message sent by the server to the first terminal device are encrypted by the server.

Optionally, the method further includes: receiving, by the server, the second ID of the second terminal device sent by the second terminal device, and a message authentication code (MAC) that is generated by the second terminal device for the second ID of the second terminal device; verifying, by the server, the MAC of the second ID of the second terminal device according to the first shared key; and if the server verifies the MAC of the second ID of the second terminal device, sending, by the server to the second terminal device, a provision complete message, and a MAC of the provision complete message that is generated by the server for the provision complete message.

According to an eighth aspect, a server is provided. The server may be configured to perform each process performed by the server in the mobile network authentication method according to the seventh aspect and various implementations, and the server includes:

a receiving module, configured to receive a first message sent by a first terminal device, where the first message includes a DH public key of each second terminal device of at least one second terminal device and a first ID of the second terminal device that are received by the first terminal device from the second terminal device, the first terminal device is a device holding a shared key, and the at least one second terminal device is a device not holding a shared key; a determining module, configured to determine a DH public key of the server according to a second random number and generate a second ID of the second terminal device for the second terminal device, where the second ID is used to identify a subscription user, where the determining module is further configured to determine, according to the DH public key of the second terminal device and the second random number, a first shared key of the second terminal device used for authentication with the second terminal device; and a sending module, configured to send a second message to the first terminal device, where the second message includes the DH public key of the server and the second ID of the second terminal device.

According to a ninth aspect, another server is provided. The server includes a processor, a receiver, a transmitter, and a memory. The memory is configured to store an instruction, the processor is configured to execute the instruction stored in the memory, and when the processor executes the instruction stored in the memory, the execution enables the processor to perform the method according to the seventh aspect or any possible implementation of the seventh aspect.

The receiver is configured to receive a first message sent by a first terminal device, where the first message includes a DH public key of each second terminal device of at least one second terminal device and a first ID of the second terminal device that are received by the first terminal device from the second terminal device, the first terminal device is a device holding a shared key, and the at least one second terminal device is a device not holding a shared key; the processor is configured to: determine a DH public key of the server according to a second random number and generate a second ID of the second terminal device for the second terminal device, where the second ID is used to identify a subscription user; and determine, according to the DH public key of the second terminal device and the second random number, a first shared key of the second terminal device used for authentication with the second terminal device; and the transmitter is configured to send a second message to the first terminal device, where the second message includes the DH public key of the server and the second ID of the second terminal device.

According to a tenth aspect, a mobile network authentication method is provided. The method includes:

receiving, by a first terminal device, a Diffie-Hellman (DH) public key and a first identity (ID) that are sent by at least one second terminal device, where the first terminal device is a device holding a shared key, and the at least one second terminal device is a device not holding a shared key; sending, by the first terminal device, an attach request message to a network authentication entity, where the attach request message includes a first message and an identity ID of the first terminal device, and the first message includes a DH public key of each second terminal device of the at least one second terminal device and a first ID of the second terminal device; receiving, by the first terminal device, a user authentication request message that is sent by the network authentication entity based on the attach request message, where the user authentication request message includes a second message and authentication data, the second message includes a DH public key of a server and a second ID of the second terminal device that is generated by the server for the second terminal device, and the second ID is used to identify a subscription user; and sending, by the first terminal device, the DH public key of the server and the second ID of the second terminal device to the second terminal device, so that the second terminal device determines, according to the second ID of the second terminal device and the DH public key of the server, a first shared key of the second terminal device and the second ID of the second terminal device that are used for authentication with the server.

Therefore, a terminal device can establish, in a process of performing authentication with an operator network according to a credential held by the terminal device, a channel for key negotiation between a terminal device not holding a credential pre-issued by an operator and the server for the terminal device not holding a credential pre-issued by the operator, so that the terminal device not having a credential pre-issued by the operator can also obtain, from the server, a shared key used for authentication with the operator network, thereby accessing the network.

Optionally, the method further includes: receiving, by the first terminal device, the second ID of the second terminal device sent by the second terminal device, and a message authentication code (MAC) that is generated by the second terminal device for the second ID of the second terminal device; sending, by the first terminal device, the second ID of the second terminal device and the MAC of the second ID of the second terminal device to the network authentication entity; receiving, by the first terminal device, a provision complete message that is sent by the network authentication entity based on the second ID of the second terminal device and the MAC of the second ID of the second terminal device; and sending, by the first terminal device, the provision complete message to the second terminal device.

Optionally, the method further includes: sending, by the first terminal device, a user authentication response message to the network authentication entity based on the user authentication request message; and receiving, by the first terminal device, an authentication success message that is sent by the network authentication entity based on the authentication response message.

Optionally, the server includes a home subscriber server (HSS).

Optionally, the network authentication entity includes a mobility management entity MME.

According to an eleventh aspect, a terminal device is provided. The terminal device is a first terminal device, the terminal device may be configured to perform each process performed by the first terminal device in the mobile network authentication method according to the tenth aspect and various implementations, the first terminal device is a device holding a shared key, and the first terminal device includes:

a receiving module, configured to receive a Diffie-Hellman (DH) public key and a first identity (ID) that are sent by at least one second terminal device, where the at least one second terminal device is a device not holding a shared key; and a sending module, configured to send a first message to a server, where the first message includes a DH public key of each second terminal device of the at least one second terminal device and a first ID of the second terminal device, where the receiving module is further configured to receive a second message that is sent by the server based on the first message, where the second message includes a DH public key of the server and a second ID of the second terminal device that is generated by the server for the second terminal device, and the second ID is used to identify a subscription user; and the sending module is further configured to send the second ID of the second terminal device and the DH public key of the server to the second terminal device, so that the second terminal device determines, according to the second ID of the second terminal device and the DH public key of the server, a first shared key of the second terminal device and the second ID of the second terminal device that are used for authentication with the server.

According to a twelfth aspect, another terminal device is provided. The terminal device is a first terminal device, the first terminal device is a device holding a shared key, and the first terminal device includes a processor, a receiver, a transmitter, and a memory. The memory is configured to store an instruction, the processor is configured to execute the instruction stored in the memory, and when the processor executes the instruction stored in the memory, the execution enables the processor to perform the method according to the tenth aspect or any possible implementation of the tenth aspect.

The receiver is configured to receive a Diffie-Hellman (DH) public key and a first identity (ID) that are sent by at least one second terminal device, where the at least one second terminal device is a device not holding a shared key; and the transmitter is configured to send a first message to a server, where the first message includes a DH public key of each second terminal device of the at least one second terminal device and a first ID of the second terminal device, where the receiver receives a second message that is sent by the server based on the first message, where the second message includes a DH public key of the server and a second ID of the second terminal device that is generated by the server for the second terminal device, and the second ID is used to identify a subscription user; and the transmitter sends the second ID of the second terminal device and the DH public key of the server to the second terminal device, so that the second terminal device determines, according to the second ID of the second terminal device and the DH public key of the server, a first shared key of the second terminal device and the second ID of the second terminal device that are used for authentication with the server.

According to a thirteenth aspect, a mobile network authentication method is provided. The method includes:

receiving, by a network authentication entity, an attach request message sent by a first terminal device, where the attach request message includes a first message and an identity (ID) of the first terminal device, the first message includes a DH public key of each second terminal device of at least one second terminal device and a first ID of the second terminal device, the first terminal device is a device holding a shared key, and the at least one second terminal device is a device not holding a shared key; sending, by the network authentication entity, an authentication data request message to a server according to the attach request message; receiving, by the network authentication entity, an authentication data response message that is sent by the server based on the authentication data request message, where the authentication data response message includes a second message and an authentication vector, the second message includes a DH public key of the server and a second ID of the second terminal device that is generated by the server for the second terminal device, and the second ID is used to identify a subscription user; and sending, by the network authentication entity, the second message and authentication data in the authentication vector to the first terminal device, so that the first terminal device sends the DH public key of the server and the second ID of the second terminal device to the second terminal device.

Therefore, the network authentication entity can provide, in a process of authenticating a terminal device holding a credential, a channel for key negotiation between a terminal device not holding a credential pre-issued by an operator and the server for the terminal device not holding a credential pre-issued by the operator, so that the terminal device not having a credential pre-issued by the operator can also obtain, from the server, a shared key used for authentication with an operator network, thereby accessing the network.

Optionally, the method further includes: receiving, by the network authentication entity, the second ID of the second terminal device that is sent by the first terminal device, a message authentication code (MAC) that is generated by the second terminal device for the second ID of the second terminal device, and a user authentication response message that is sent by the first terminal device based on a user authentication request message; sending, by the network authentication entity, the second ID of the second terminal device and the MAC of the second ID of the second terminal device to the server; receiving, by the network authentication entity, a provision complete message that is sent by the server based on the second ID of the second terminal device and the MAC of the second ID of the second terminal device; and sending, by the network authentication entity according to the user authentication response message, an authentication success message to the first terminal device, and sending the provision complete message to the first terminal device, so that the first terminal device sends the provision complete message to the second terminal device.

According to a fourteenth aspect, a network authentication entity is provided. The network authentication entity may be configured to perform each process performed by the network authentication entity in the mobile network authentication method according to the thirteenth aspect and various implementations, and the network authentication entity includes:

a receiving module, configured to receive an attach request message sent by a first terminal device, where the attach request message includes a first message and an identity (ID) of the first terminal device, the first message includes a DH public key of each second terminal device of at least one second terminal device and a first ID of the second terminal device, the first terminal device is a device holding a shared key, and the at least one second terminal device is a device not holding a shared key; and a sending module, configured to send an authentication data request message to a server according to the attach request message, where the receiving module is further configured to receive an authentication data response message that is sent by the server based on the authentication data request message, where the authentication data response message includes a second message and an authentication vector, the second message includes a DH public key of the server and a second ID of the second terminal device that is generated by the server for the second terminal device, and the second ID is used to identify a subscription user; and the sending module is further configured to send the second message and authentication data in the authentication vector to the first terminal device, so that the first terminal device sends the DH public key of the server and the second ID of the second terminal device to the second terminal device.

According to a fifteenth aspect, another network authentication entity is provided. The network authentication entity includes a processor, a receiver, a transmitter, and a memory. The memory is configured to store an instruction, the processor is configured to execute the instruction stored in the memory, and when the processor executes the instruction stored in the memory, the execution enables the processor to perform the method according to the thirteenth aspect or any possible implementation of the thirteenth aspect.

The receiver is configured to receive an attach request message sent by a first terminal device, where the attach request message includes a first message and an identity (ID) of the first terminal device, the first message includes a DH public key of each second terminal device of at least one second terminal device and a first ID of the second terminal device, the first terminal device is a device holding a shared key, and the at least one second terminal device is a device not holding a shared key; and the transmitter is configured to send an authentication data request message to a server according to the attach request message, where the receiver is further configured to receive an authentication data response message that is sent by the server based on the authentication data request message, where the authentication data response message includes a second message and an authentication vector, the second message includes a DH public key of the server and a second ID of the second terminal device that is generated by the server for the second terminal device, and the second ID is used to identify a subscription user; and the transmitter is further configured to send the second message and authentication data in the authentication vector to the first terminal device, so that the first terminal device sends the DH public key of the server and the second ID of the second terminal device to the second terminal device.

According to a sixteenth aspect, a mobile network authentication method is provided. The method includes:

receiving, by a server, an authentication data request message sent by a network authentication entity, where the authentication data request message includes a first message and an identity (ID) of a first terminal device, the first message includes a DH public key of each second terminal device of at least one second terminal device and a first ID of the second terminal device, and the at least one second terminal device is a device not holding a shared key; determining, by the server, a DH public key of the server, and generating a second ID of the second terminal device for the second terminal device, where the second ID is used to identify a subscription user; determining, by the server, an authentication vector based on the authentication data request message; and sending, by the server, a user authentication response message to the network authentication entity, where the user authentication response message includes a second message and the authentication vector, and the second message includes the DH public key of the server and the second ID of the second terminal device.

Optionally, the method includes: receiving, by the server, the second ID of the second terminal device sent by the network authentication entity, and a message authentication code (MAC) that is generated by the second terminal device for the second ID of the second terminal device; verifying, by the server, the MAC of the second ID of the second terminal device according to a first shared key; and if the server verifies the MAC of the second ID of the second terminal device, sending, by the server, a provision complete message to the network authentication entity.

Therefore, the server can provide, for a terminal device not having a credential pre-issued by an operator, in a DH key exchange manner, and in a process of performing authentication with a terminal device holding a credential, a shared key used for authentication with an operator network, thereby enabling the terminal device not having a credential pre-issued by the operator to access the network.

According to a seventeenth aspect, a server is provided. The server may be configured to perform each process performed by the server in the mobile network authentication method according to the sixteenth aspect and various implementations, and the server includes: a receiving module, configured to receive an authentication data request message sent by a network authentication entity, where the authentication data request message includes a first message and an identity (ID) of a first terminal device, the first message includes a DH public key of each second terminal device of at least one second terminal device and a first ID of the second terminal device, and the at least one second terminal device is a device not holding a shared key; a determining module, configured to determine a DH public key of the server and generate a second ID of the second terminal device for the second terminal device, where the second ID is used to identify a subscription user, where the determining module is further configured to determine an authentication vector based on the authentication data request message; and a sending module, configured to send a user authentication response message to the network authentication entity, where the user authentication response message includes a second message and the authentication vector, and the second message includes the DH public key of the server and the second ID of the second terminal device.

According to an eighteenth aspect, another server is provided. The server includes a processor, a receiver, a transmitter, and a memory. The memory is configured to store an instruction, the processor is configured to execute the instruction stored in the memory, and when the processor executes the instruction stored in the memory, the execution enables the processor to perform the method according to the sixteenth aspect or any possible implementation of the sixteenth aspect.

The receiver is configured to receive an authentication data request message sent by a network authentication entity, where the authentication data request message includes a first message and an identity (ID) of a first terminal device, the first message includes a DH public key of each second terminal device of at least one second terminal device and a first ID of the second terminal device, and the at least one second terminal device is a device not holding a shared key; a determining module is configured to determine a DH public key of the server and generate a second ID of the second terminal device for the second terminal device, where the second ID is used to identify a subscription user; and the processor is configured to determine an authentication vector based on the authentication data request message; and the transmitter is configured to send a user authentication response message to the network authentication entity, where the user authentication response message includes a second message and the authentication vector, and the second message includes the DH public key of the server and the second ID of the second terminal device.

According to a nineteenth aspect, a computer readable medium is provided. The computer readable medium is configured to store a computer program, and the computer program includes an instruction used to perform the method according to the first aspect or any possible implementation of the first aspect.

According to a twentieth aspect, a computer readable medium is provided. The computer readable medium is configured to store a computer program, and the computer program includes an instruction used to perform the method according to the fourth aspect or any possible implementation of the fourth aspect.

According to a twenty first aspect, a computer readable medium is provided. The computer readable medium is configured to store a computer program, and the computer program includes an instruction used to perform the method according to the seventh aspect or any possible implementation of the seventh aspect.

According to a twenty second aspect, a computer readable medium is provided. The computer readable medium is configured to store a computer program, and the computer program includes an instruction used to perform the method according to the tenth aspect or any possible implementation of the tenth aspect.

According to a twenty third aspect, a computer readable medium is provided. The computer readable medium is configured to store a computer program, and the computer program includes an instruction used to perform the method according to the thirteenth aspect or any possible implementation of the thirteenth aspect.

According to a twenty fourth aspect, a computer readable medium is provided. The computer readable medium is configured to store a computer program, and the computer program includes an instruction used to perform the method according to the sixteenth aspect or any possible implementation of the sixteenth aspect.

Based on the mobile network authentication method according to the embodiments of this application, a terminal device not having a credential pre-issued by an operator may obtain, from the server in a DH key exchange manner by using another terminal device holding a credential, a shared key used for authentication with an operator network, thereby accessing the network.

DESCRIPTION OF EMBODIMENTS

Figure 1:
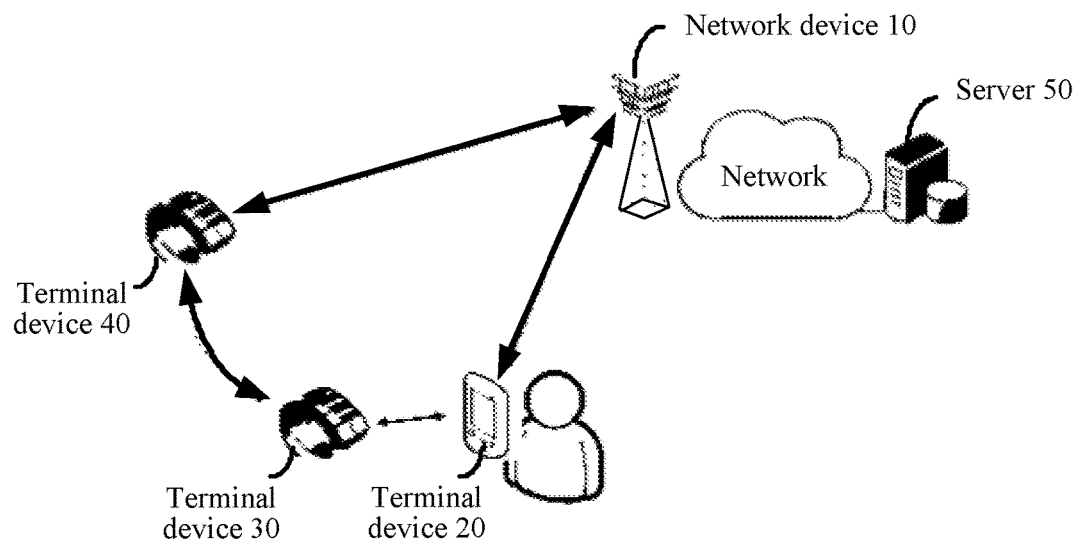
FIG. 1 is a schematic diagram of an application scenario according to an embodiment of this application.

The following clearly and completely describes the technical solutions in the embodiments of this application with reference to the accompanying drawings in the embodiments of this application.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

It should be understood that the technical solutions of this application may be applied to various communications systems such as a Global System for Mobile Communications (GSM), a Code Division Multiple Access (CDMA) system, a Wideband Code Division Multiple Access (WCDMA), a general packet radio service (GPRS), a Long Term Evolution (LTE) system, a Long Term Evolution Advanced (LTE-A) system, a Universal Mobile Telecommunications System (UMTS), and a 5G communications system.

It should be further understood that, in the embodiments of this application, a terminal device may also be user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or a terminal device in a future evolved PLMN.

A network device in the embodiments of this application may be a device configured to communicate with a terminal device. For example, the network device may be a base transceiver station (BTS) in a GSM system or CDMA, may be a NodeB (NB) in a WCDMA system, or may be an evolved NodeB (, eNB or eNodeB) in an LTE system, or the network device may be a relay station, an access point, an in-vehicle device, a wearable device, a network side device in a future 5G network, a network device in a future evolved PLMN network, or the like.

FIG. 1 is a schematic diagram of an application scenario according to an embodiment of this application. As shown in FIG. 1, the communications system may include a network device 10, a terminal device 20, a terminal device 30, a terminal device 40, and a server 50. An arrow shown in FIG. 1 may indicate a connection between devices. For an Internet of Things scenario, a terminal device accesses a cellular network either directly or by using a companion device. For example, as shown in FIG. 1, the terminal device 30 and the terminal device 40 may be Internet of Things devices, the terminal device 40 may directly connect to the network device 10 and access a core network, and the terminal device 30 may connect to the network device 10 by using a companion device, that is, the terminal device 20, and access the core network.

It should be noted that, this scenario of accessing a cellular network by using a companion device requires that an Internet of Things device also needs to perform end-to-end bidirectional authentication with the cellular network. During authentication, a credential issued by an operator, that is, an international mobile subscriber identity (IMSI) and a pre-shared key needs to be used.

Therefore, in both of the foregoing two scenarios, an Internet of Things device needs to have a credential of the Internet of Things device. A conventional device such as a mobile phone may obtain a 3GPP credential by using a physical subscriber identity module (SIM) card. However, due to a characteristic of an Internet of Things device, a physical SIM card is not applicable. Additionally, an embedded subscriber identity module (eSIM), a soft SIM, or the like is a relatively good choice for an Internet of Things device. However, in an Internet of Things communication scenario, a vendor does not learn where an Internet of Things device is finally used, namely, a network of an operator in which the Internet of Things device is finally used. Therefore, it is quite likely that no initial credential is configured for the Internet of Things device at delivery.

Therefore, existing technologies and specifications cannot satisfy such a requirement of remotely obtaining a credential of an operator by a terminal device that does not hold a credential pre-issued by the operator. To resolve this problem, this application proposes that a terminal device remotely obtains a credential of an operator by using a companion device holding a shared key, and therefore may perform bidirectional authentication with a corresponding network by using the obtained credential of the operator, access the network, and use the network.

It should be noted that, the example in FIG. 1 is intended to only help a person skilled in the art better understand this embodiment of this application, but not intended to limit the scope of this embodiment of this application. For example, access of only one Internet of Things device to a network by using a companion device is described in FIG. 1, but in this embodiment of this application, more Internet of Things devices may access the network by using the companion device, or more companion devices may be configured to implement access of different Internet of Things devices. Moreover, a type of a terminal device is not limited in this application.

It should be understood that, a companion device (Companion UE) in this embodiment of this application may also be referred to as a paired device, a guarantee device, a device having a SIM card, an intermediate device, or the like. The companion device holds a credential pre-issued by an operator, has a shared key pre-issued by an operator network, and may complete authentication by using the shared key. An entire authentication process does not require participation of a person or another device. For example, the companion device may be a device holding a SIM card in a 2G network, a device holding a USIM card, an ISIM card, or the like in a 3G or 4G network, a device holding another subscriber identity module configured to identify a user identity in a future 5G, a device holding a preset certificate that has a high security capability or has high security and that is pre-issued by a network, or a device that has a strong shared key (for example, user name or password) access capability.

Specific content of cards held by the companion devices listed above is described as only an example, and should not constitute any limitation on this application, and this application should be not limited thereto either. Each device that completes authentication with an operator by using a subscriber identity module may be a companion device in this embodiment of this application.

It should be further understood that, in this embodiment of this application, a terminal device not having a credential pre-issued by an operator network cannot complete an authentication process by itself in an authentication process of requesting to access the network, and needs to depend on participation of a person to complete authentication through man-machine interaction. In this embodiment of this application, the terminal device not having a credential pre-issued by the operator network may obtain, by using a companion device paired with the terminal device, a shared key for performing authentication with the server and an identity that is used to identify a subscription user, for example, an international mobile subscriber identity number (IMSI).

It should be further understood that, a credential in this embodiment of this application may include a shared key and an identity that is used to identify a subscription user, for example, an IMSI, and may further include other useful information. This is not limited herein.

For convenience of understanding, related technologies used in the embodiments of this application are described below with reference to FIG. 1 to FIG. 4.

1. Asymmetric Cryptography (Asymmetric Cryptography)

The asymmetric cryptography is a type of cryptology algorithm. A pair of keys is required in this cryptology method, one key is a private key, and the other key is a public key. The two keys are mathematically related, and information obtained through encryption by using a key of a user can be decrypted by using only a decryption key of the user. Even if one of the two keys is learned, the other key cannot be calculated. Therefore, even if one of a pair of keys is publicized, a secret property of the other key is not endangered. A private key is held by a key pair owner and cannot be publicized, and a public key is publicized by the key pair holder to other persons. Therefore, a publicized key is referred to as a public key; and a non-publicized key is referred to as a private key.

If an encryption key is publicized, the publicized encryption key is used by a client to upload encrypted data to a private key owner. This is referred to as public key encryption. Data encrypted by using a public key can be decrypted by using only a private key, and the private key is used to decrypt the data encrypted by using the public key. Common public key encryption algorithms include: RSA, ElGamal, a knapsack algorithm, Rabin (a special case of RSA), and an elliptic curve cryptography (ECC). The RSA algorithm (derived from acronyms of family names of inventors Rivest, Shmir, and Adleman) is used most widely, and is a famous public key encryption algorithm.

If a decryption key is publicized, information encrypted by using a private key may be decrypted by using a public key, and the decryption key is used by a client to verify that data or a file published by a party holding the private key is integral and accurate. A receiving party can learn, based on this, that this piece of information is actually from a person owning the private key. This is referred to as a digital signature, and a form of the public key is a digital certificate. For example, each installation program downloaded from a network usually carries a digital signature of a programmer, and the digital signature may prove that the program is actually published by the author (corporation) other than forged by a third party and is not tampered (identity authentication/verification).

2. Digital Signature and Verification of the Digital Signature

Figure 2:
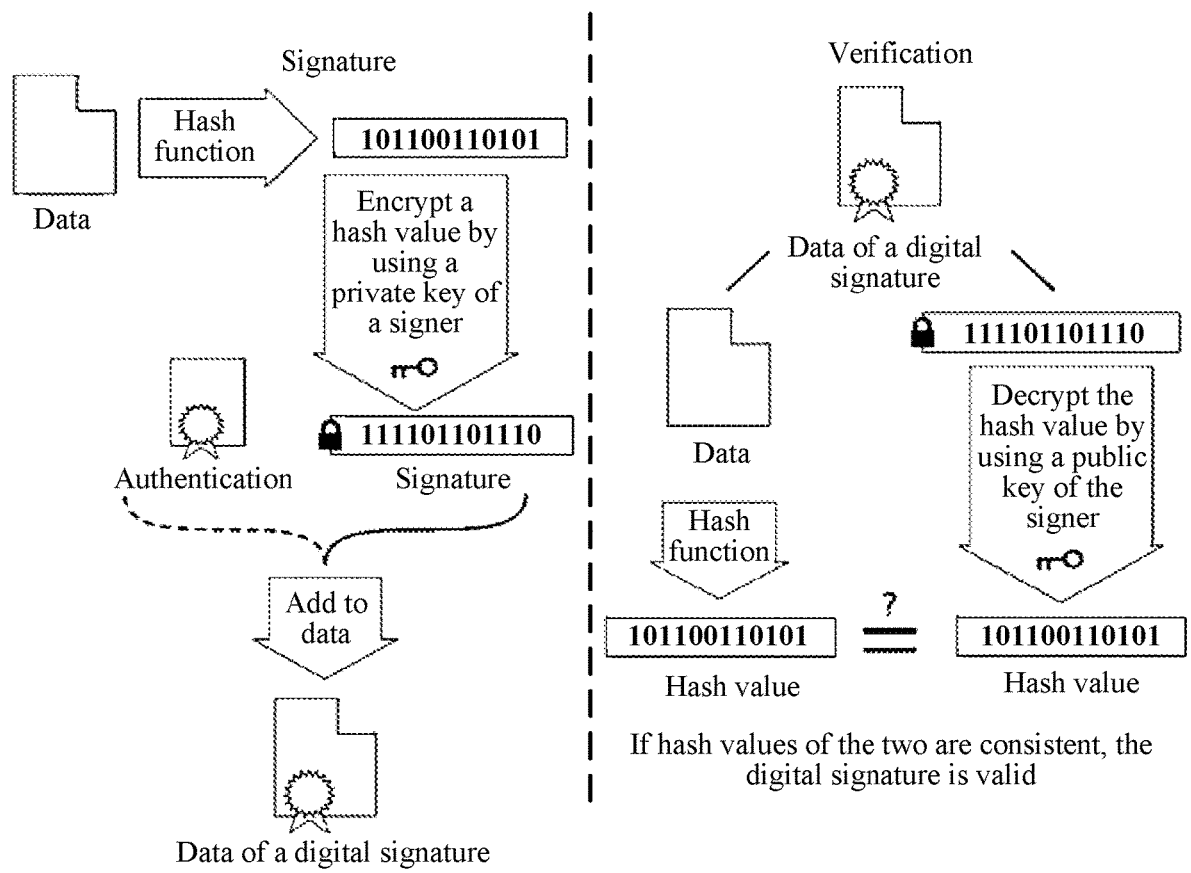
FIG. 2 is a schematic diagram of a digital signature and verification process.

FIG. 2 is a schematic diagram of a digital signature and verification. As shown in FIG. 2, a sending party encrypts, by using a private key, a digest of a text that needs to be transmitted, and an obtained ciphertext is referred to as a digital signature (briefly referred to as "signature") of the current transmission process, where the digest of the transmitted text is obtained after HASH calculation such as SHA1 and SHA2 is performed on the text that needs to be transmitted.

After obtaining the transmitted text, a receiving party, that is, a party receiving data needs to determine whether the text is content sent by the sending party and whether the text is ever tampered midway. Therefore, the receiving party may decrypt the signature by using a public key held by the receiving party (data encrypted by using one key in a key pair can be undoubtedly decrypted by using the other key), to obtain the digest of the transmitted text, then calculate a digest value by using a HASH algorithm the same as that used by the sending party, and then compare the digest value with the digest obtained through decryption. If it is found that the two are completely consistent, it indicates that the transmitted text is not tampered.

In a signature process, the receiving party needs to retain a public key, but each sending party has a public key. Therefore, the receiving party needs to store a great many public keys. This cannot be managed at all. Moreover, a locally stored public key is likely to be tampered or replaced. This cannot be found. Therefore, to resolve this problem, a uniform certificate management authority may manage public keys of all sending parties, and authenticate and encrypt these public keys. This authority is a frequently-mentioned certificate agency (CA). An authenticated and encrypted public key is a certificate and is also referred to as a CA certificate, and the certificate includes many pieces of information, a most important piece of which is a public key of an applicant. When encrypting a public key, the CA authority uses a uniform key pair. When encrypting the public key, the CA authority uses a private key in the key pair. In this way, after obtaining the certificate and when sending data, the applicant uses a private key of the applicant to generate a signature, and sends the signature, the certificate, and sent content together to a peer party. After obtaining the certificate, the peer party needs to decrypt the certificate to obtain the public key in the certificate. A public key in the "uniform key pair" of the CA authority needs to be used for decryption. This public key is a frequently-mentioned CA root certificate, and usually needs to be downloaded from a certificate issuer and installed onto a corresponding data collection client, for example, onto a browser. This public key needs to be installed only once. The certificate may be decrypted after this public key is owned. A public key of a sending party is obtained, then a signature sent from the sending party is decrypted, a digest is obtained, a digest is calculated again, and the digests are compared, so as to verify integrity of data content.

3. Identity-Based Cryptography

The identity-based cryptography (IBC) includes an identity-based signature technology (IBS) and an identity-based encryption technology (IBE). Each user owns a pair of public and private keys of the user, where the public key is a meaningful character string (identity) such as an Email address or a phone number; and the private key of the user is generated by a private key generator (PKG) according to an ID of the user and a master private key of the PKG, the PKG does not need to participate in a signature process, and only a signature, a message, an identity, and a master public key are required for signature verification. A conventional public key infrastructure (PKI) mechanism and the IBC are different in that, in the PKI, a user owns a pair of different public and private keys, the public key is a random character string, a certificate center needs to sign the public key to determine that a public key belongs to a user, and a certificate needs to be verified in a signature or encryption process.

Figure 3:
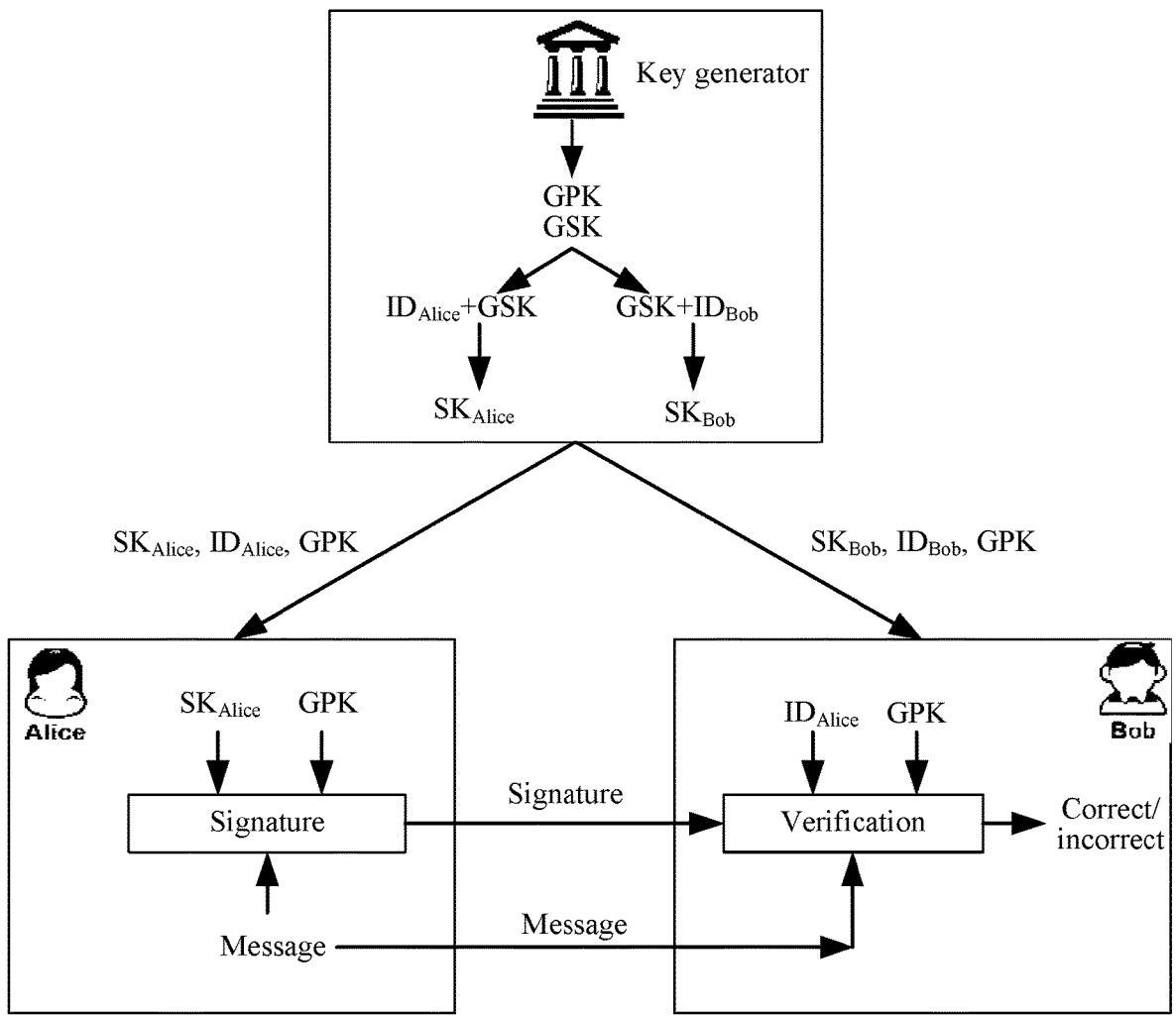
FIG. 3 is a schematic diagram of an identity-based cryptography.

In a schematic diagram of an identity-based cryptography shown in FIG. 3, users Alice and Bob own respective pairs of public and private keys, a PKG generates a private key $SK_{Alice}$ of Alice according to an $ID_{Alice}$ of Alice and a master private key of the PKG, Alice uses the private key of Alice to sign a message that needs to be transmitted. The PKG does not need to participate in the signature process. When Bob verifies a signature sent by Alice, only the signature, the message, the $ID_{Alice}$, and a master public key GPK are required.

4. Diffie-Hellman Key Exchange

Figure 4:
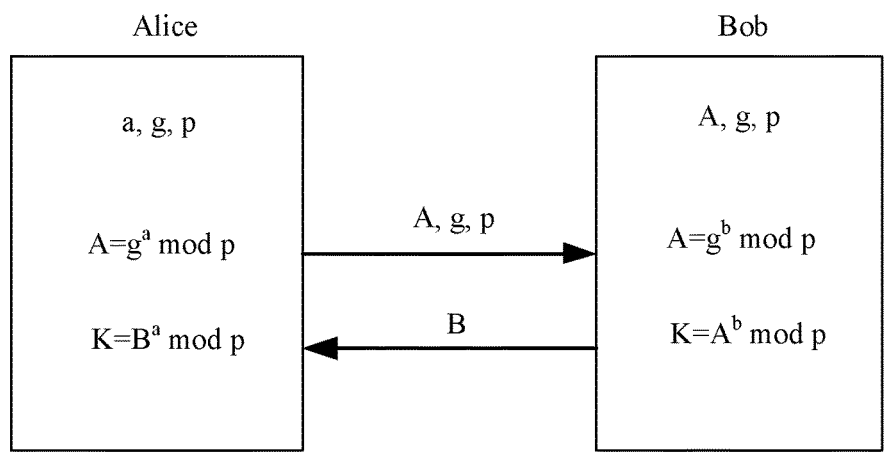
FIG. 4 is a schematic diagram of a Diffie-Hellman key exchange process.

As shown in FIG. 4, according to Diffie-Hellman, a shared secret that may be used for secure communication on a common channel may be created by exchanging a piece of information by using the common channel. This earliest proposed protocol is based on use of a multiplicative group of an integer modulo n of a prime number p and a primitive root g of the multiplicative group, and a process (which includes a mathematical part of an algorithm) of the protocol is explained below:

(1) Alice and Bob write a finite cyclic group G and a generating element g of the limited cyclic group G.

This is usually stipulated a long time before the beginning of the protocol, where g is public and may be seen by all attackers.

(2) Alice selects a random natural number a, and sends $A=g^{\{a\}}$ mod p to Bob.

(3) Bob selects a random natural number b, and sends $B=g^{\{b\}}$ mod p to Alice.

(4) Alice calculates $B^{\{a\}}$ mod p.

(5) Bob calculates $A^{\{b\}}$ mod p.

(6) Alice and Bob jointly negotiate a group element $K=g^{\{ab\}}$ mod p, which may be used as a shared secret.

mod indicates a modulo operation.

Two manners in which a terminal device and a server perform bidirectional authentication in the prior art are described below based on the foregoing related description.

Figure 5:
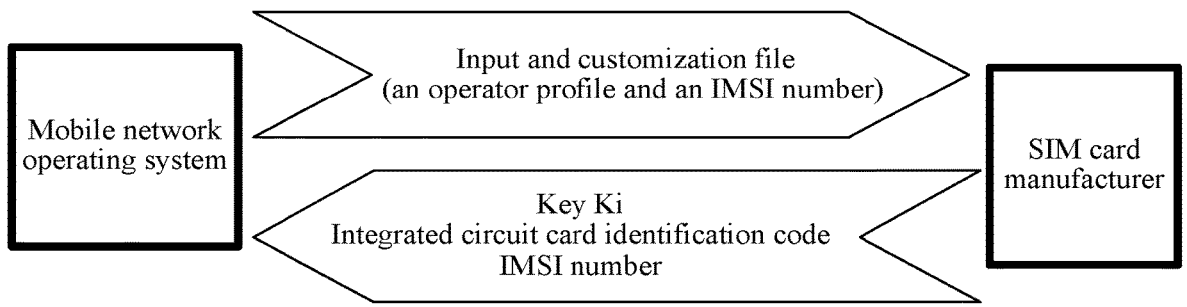
FIG. 5 is a schematic diagram of a conventional bidirectional authentication process based on a physical SIM card.

FIG. 5 is a schematic diagram of a conventional bidirectional authentication process based on a physical SIM card. As shown in FIG. 5, in an existing mobile communications network (3G network/LTE network), a terminal device and a server perform bidirectional authentication based on a pre-shared key. Key pre-sharing is to place a symmetric key in a SIM card of a terminal and a home subscriber server (HSS) of a core network in advance. During authentication, a used protocol is an Authentication and Key Agreement (AKA) described in 3GPP TS 33.401. During authentication, a credential that needs to be used is an IMSI and a pre-shared key, and these pieces of information are stored in the SIM card.

In a conventional credential configuration process, an operator needs to provide, to a SIM card manufacturer, an input and customization file including an IMSI number, a user profile, and an operator profile. After receiving these pieces of data, the SIM card manufacturer generates a corresponding key for each IMSI number, and writes the IMSI number and the corresponding key Ki to a physical SIM card. Moreover, the IMSI number, the key, and a correspondence between the IMSI number and the key are stored in a physical compact disc. Then, the SIM card and the CD are returned to the operator together. The operator stores, in an HS S of the operator, the IMSI number, the key, and the correspondence between the IMSI number and the key that are obtained. Then, when a user subscribes, the SIM card is issued to the user. After inserting the SIM card into a mobile phone, the user may perform mutual authentication with an operator network by using the IMSI number and the pre-shared key that are stored in the SIM, thereby accessing and using the network.

Main disadvantages of this bidirectional authentication manner based on a SIM card are: The entire process is performed offline, a chain is long, a quantity of steps is large, a period is long, and transportation and maintenance costs are high. A credential is issued to a user by using a physical SIM card, and the user needs to replace the physical SIM card if the user changes an operator. It is not feasible for an Internet of Things device to use a physical SIM card in many situations because of a characteristic of the Internet of Things device. For example, an industrial Internet of Things device needs to operate in an extreme environment, and a high temperature, humidity, dust, violent vibration, or the like makes a SIM card have undesired contact or be damaged extremely easily. Moreover, because a quantity of Internet of Things devices is huge, once SIM cards need to be replaced, workload is quite huge. Additionally, Internet of Things devices are usually some small-sized devices such as sensors, and use of a conventional SIM card limits space and design of an Internet of Things device.

Figure 6:
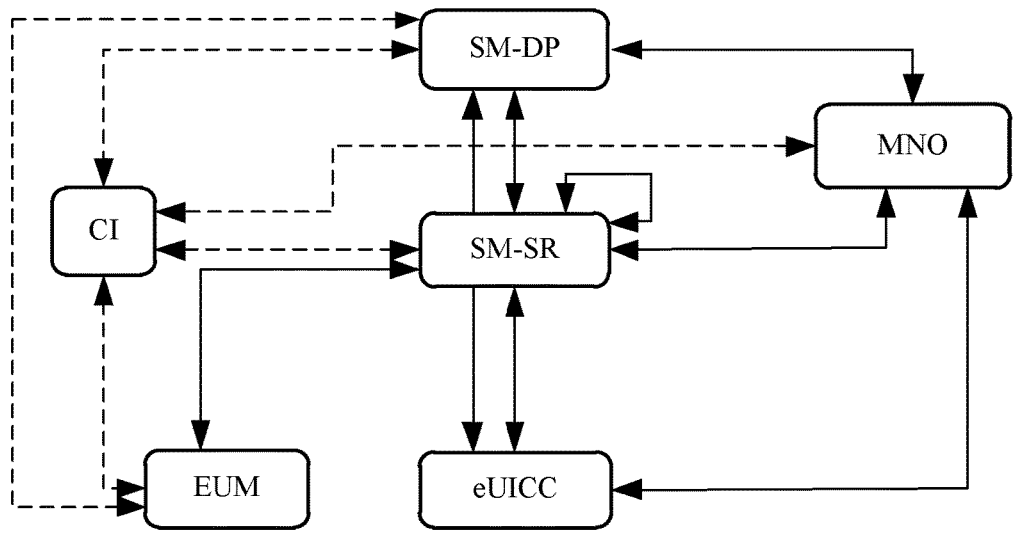
FIG. 6 is a schematic diagram of an eUICC-based bidirectional authentication process.

FIG. 6 is a schematic diagram of an eUICC-based bidirectional authentication process. A primary part of an existing bidirectional authentication process is a remote configuration standard formulated by the GSMA, and a remote configuration process is performed based on the standard, thereby implementing bidirectional authentication between a terminal device and a server. FIG. 6 shows a process of embedded universal integrated circuit card (eUICC) based remote configuration formulated by the Global System for Mobile Communications Alliance (GSMA). A main function of subscription manager data preparation (SM-DP) is responsible for securely executing a platform management command and securely transmitting a text management command, and a main function of subscription manager secure routing (SM-SR) is responsible for securely executing the platform management command and securely transmitting the text management command. The process of the remote configuration based on this architecture is as follows: A certificate issuer (CI) issues a certificate to the SM-DP and the SM-SR. The CI generates a series of certificates for an eUICC manufacturer (EUM). When manufacturing an eUICC, the EUM places a certificate into the eUICC. When needing to remotely obtain a credential provided by an operator (MNO), the eUICC performs mutual authentication with the SM-SR and the SM-DP by using the certificate of the eUICC, and then establishes secure channels. The SM-DP and the SM-SR are usually deployed by the MNO, and therefore secure channels exist between the SM-DP and the MNO and between the SM-SR and the MNO. Then, the credential of the MNO is downloaded to the eUICC through the SM-DP and the SM-SR. After obtaining the credential provided by the MNO, the eUICC may directly access and use a network of the MNO by using this credential.

In this bidirectional authentication manner based on the existing GSMA specification, an initial credential needs to be used to perform mutual authentication with the operator and establish a secure channel. Therefore, it is required that an initial credential (certificate or pre-shared secret) is necessarily built in the eUICC. However, in an Internet of Things scenario, a vendor does not learn where an Internet of Things device is finally used, namely, a network of an operator in which the Internet of Things device is finally used. Therefore, it is quite likely that no initial credential is configured for the Internet of Things device at delivery. Therefore, existing technologies and specifications cannot satisfy such a requirement of remotely obtaining a credential of an operator by an Internet of Things device having no initial credential. If this technology needs to be used, an operator needs to deploy an SM-DP server and an SM-SR server, and needs to obtain a certificate from the CI. This increases operation and maintenance costs of the operator.

For convenience of distinguishing and understanding, "based on" and "according to" are used differently in this application, "based on" is used to indicate a triggering condition, and "according to" indicates a parameter used for calculation. For brevity, description of a same situation or a similar situation is omitted below.

Figure 7:
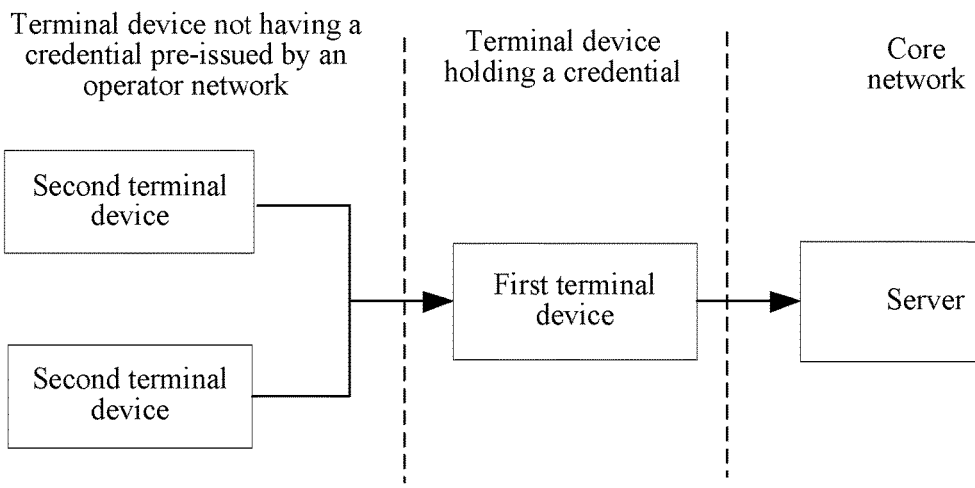
FIG. 7 is a schematic architectural diagram of a mobile network authentication method according to an embodiment of this application.

FIG. 7 is a schematic architectural diagram of a mobile network authentication method according to an embodiment of this application. In FIG. 7, two second terminal devices are at a leftmost end, a first terminal device is in the middle, and a provision server (Provision Server), of an operator network, used for network authentication is at a rightmost end and is briefly referred to as a server below. The two second terminal devices are shown herein. However, during actual application, one or more second terminal devices may exist, and none of these second terminal devices has an initial credential used for authentication with the operator network. Therefore, this embodiment of this application proposes that, these second terminal devices may access a cellular network by using the first terminal device, or may directly connect to a cellular network. In FIG. 7, the server may be an entity, the entity may be an HSS (to be specific, a function of the server may be implemented by the HSS), or the HSS and the server may be two separate entities. If the HSS and the server are two separate entities, it is assumed herein that a secure channel exists between the HSS and the server (because the HSS and the server both belong to the operator network, and belong to a same security domain). Moreover, it is assumed herein that a second terminal device may establish a secure channel with the first terminal device in another short range manner. For example, common methods for establishing a secure channel include use of a Bluetooth pairing technology, an encryption access control technology of a same Wireless Fidelity (Wi-Fi) local area network, or use of a wired manner.

The second terminal device may be a terminal device not having a credential (for example, a shared key, an identity that is used to identify a subscription user, and other related information) pre-issued by the operator network, for example, the terminal device 30 in FIG. 1, and the first terminal device may be a companion device holding a shared key, for example, the terminal device 20 in FIG. 1. In this embodiment of this application, the second terminal device may obtain, from the provision server such as the server 50 by using the first terminal device paired with the second terminal device, a credential used for authentication with the provision server.

It should be noted that, in schematic flowcharts of mobile network authentication methods according to embodiments of this application that are shown in FIG. 8 to FIG. 13, communication between a terminal and an operator network that is alternatively referred to as a core network (CN) (for example, a core network authentication entity or a provision server) may be forwarded by using an access network (AN) (for example, a base station). A same situation is not particularly described again below.

Figure 8:
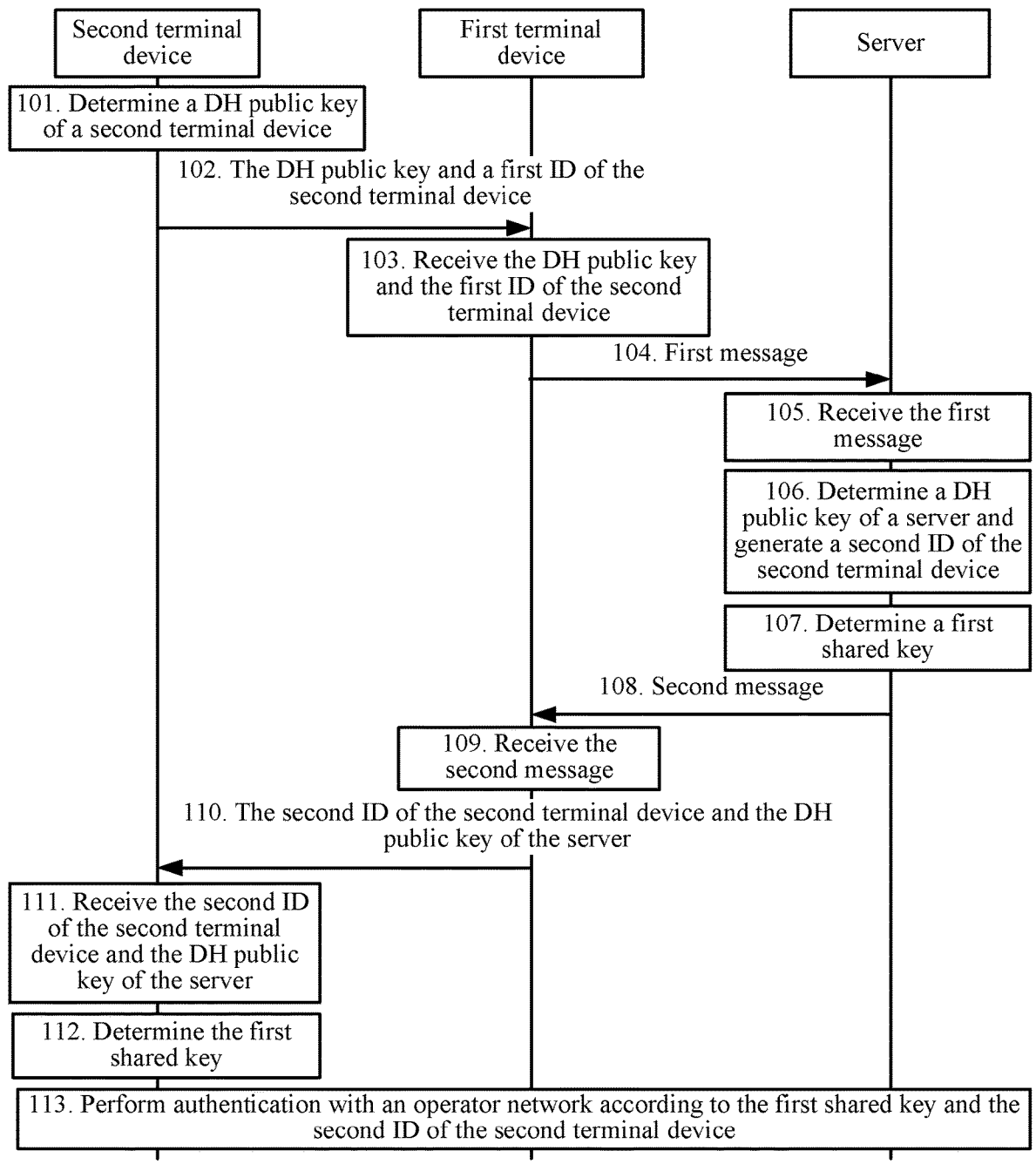
FIG. 8 is a process interaction diagram of a mobile network authentication method according to an embodiment of this application.
Figure 9:
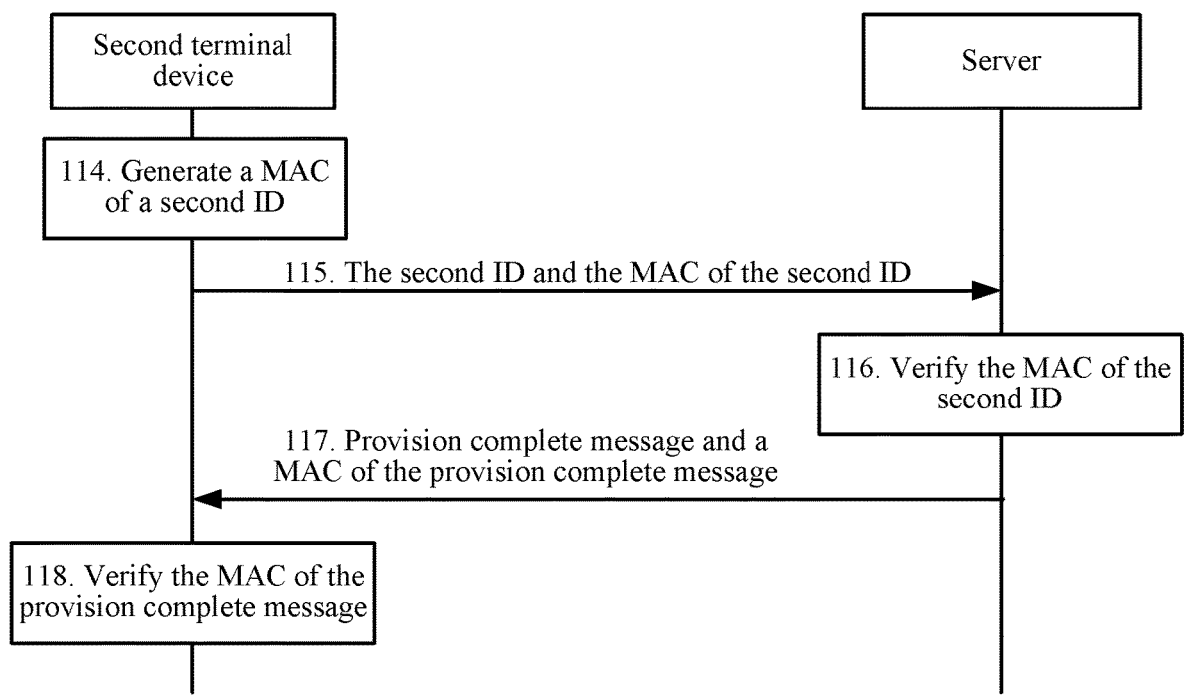
FIG. 9 is a process interaction diagram of verifying a shared key according to an embodiment of this application.

It should be understood that, the mobile network authentication methods according to the embodiments of this application that are shown in FIG. 8 to FIG. 13 may be applied to the application scenario shown in FIG. 1, or may be applied to another scenario. Description is performed below by using the application scenario shown in FIG. 1 as an example. FIG. 8 shows a first terminal device, a second terminal device, and a server.

It should be further understood that, in this embodiment of this application, at least one second terminal device may obtain, by using the first terminal device, a shared key used for authentication with the server, thereby accessing an operator network. Description is performed below by using only one second terminal device as an example. The second terminal device may obtain, from the server by using the first terminal device, a credential used to authenticate a mobile network, that is, a shared key between the second terminal device and the server and an identity that is used to identify a subscription user, but this application is not limited thereto.

FIG. 8 is a process interaction diagram of a mobile network authentication method according to an embodiment of this application. As shown in FIG. 8, the mobile network authentication method includes:

101. The second terminal device determines a Diffie-Hellman (DH) public key of the second terminal device according to a first random number.

The second terminal device is a device not holding a shared key. To be specific, the second terminal device does not have a credential pre-issued by an operator, and cannot implement authentication between the second terminal device and the server to access an operator network.

For example, the second terminal device and the server may negotiate a shared key in a Diffie-Hellman manner between each other by using the first terminal device. To be specific, under a condition that the first terminal device has a credential of the operator, the second terminal device and the server negotiate a shared key used for network authentication according to a DH key exchange method.

For example, the second terminal device may generate a random number such as RAND 1. The second terminal device calculates a DH public key, recorded as A herein, of the second terminal device according to RAND 1, and $A=g^{RAND\ 1}\ mod\ p$, where p is a prime number, g is a generating element of a finite cyclic group G, g and p may be publicized in advance or may be sent in a plaintext form, and mod is a remainder operation.

102. The second terminal device sends the DH public key of the second terminal device and a first ID of the second terminal device to the first terminal device.

The first terminal device is a device holding a shared key.

Further, the second terminal device may establish a secure channel with the first terminal device, for example, establish a secure channel in a short range communication manner such as a Bluetooth pairing technology, an encryption access control technology of a Wi-Fi local area network, or a wired manner, and send the first ID of the second terminal device and the generated public key to the first terminal device on the secure channel.

103. The first terminal device receives the DH public key and the first ID that are sent by the second terminal device.

The first terminal device receives, on the secure channel, the DH public key such as A of the second terminal device and the first ID of the second terminal device that are sent by the second terminal device.

It should be understood that, if a plurality of second terminal devices need to simultaneously obtain, from the server by using the first terminal device, a credential used for authentication with the server, the first terminal device receives a first ID and a DH public key of each of the plurality of second terminal devices.

104. The first terminal device sends a first message to the server.

The first message includes the DH public key of the second terminal device and the first ID of the second terminal device. Optionally, the first message may further include indication information, the indication information is used to indicate that the first message is used to request a shared key of the second terminal device and a second ID of the second terminal device, and the second ID is used to identify a subscription user.

For example, the indication information is used to indicate that a function of the first message is to request a credential of the second terminal device for the second terminal device, the credential may include a shared key between the second terminal device and the server, and the second ID that is used to identify the subscription user and that is generated by the server for the second terminal device, and the second ID may be, for example, an IMSI. The indication information may be, for example, a flag bit, and the flag bit may be indicated, by using different values, as a credential that one second terminal device requests an operator to issue, or a credential that a plurality of second terminal devices request an operator to issue. When the first terminal device receives the first ID of the second terminal device and the DH public key of the second terminal device that are sent by the second terminal device, the first terminal device may add the indication information to the first message sent to the server.

It should be understood that, if the first terminal device receives a first ID of each second terminal device of a plurality of second terminal devices and a DH public key of the second terminal device that are sent by the second terminal device, the first terminal device needs to send the first ID of the second terminal device and the DH public key of the second terminal device to the server.

In this case, the indication information may indicate that the first message is used to request shared keys used for authentication with the server and second IDs for the plurality of second terminal devices.

105. The server receives the first message sent by the first terminal device.

After receiving the first message sent by the first terminal device, the server may obtain the second ID of the second terminal device and the DH public key of the second terminal device from the first message, so as to generate a shared key used for authentication with the second terminal device.

106. The server determines a DH public key of the server according to a second random number, and generates a second ID of the second terminal device for the second terminal device.

For example, the server determines the DH public key of the server, and therefore may generate, according to the second random number used to generate the public key of the server and the received DH public key of the second terminal device, a first shared key of the second terminal device used for authentication with the second terminal device. Moreover, the server may transfer the public key of the server to the second terminal device, so that the second terminal device may determine, according to the DH public key of the server and the first random number that is used by the second terminal device to generate the public key of the second terminal device, a same first shared key used for authentication with the server.

For example, the server may generate a random number such as RAND 2. The server calculates a DH public key, recorded as B herein, of the server according to RAND 2, and $B=g^{RAND\ 2}\ mod\ p$, where p is a prime number, g is a generating element of a finite cyclic group G, and g and p herein may be agreed on in advance in a protocol and jointly maintained by a terminal device and the server.

The second ID is used to identify a subscription user. For example, the second ID may be an IMSI number (IMSI number) allocated by an operator to the user. Alternatively, the second ID is an ID that is generated by an operator for the second terminal device and that is used to access the operator. It should be understood that, in addition to an ID used to identify the subscription user, the second ID may further include information about another ID.

It should be understood that, if the first message received by the server includes second IDs of a plurality of second terminal devices and DH public keys of the plurality of second terminal devices, the server generates a second ID of each second terminal device of the plurality of second terminal devices for the second terminal device, so that the second terminal device performs authentication between the second terminal device and the server by using the second ID of the second terminal device.

107. The server determines, according to the DH public key of the second terminal device and the second random number of the server, a first shared key of the second terminal device used for authentication with the second terminal device.

Specifically, after receiving the first message sent by the first terminal device, the server may determine, according to the DH public key of the second terminal device in the first message, and the second random number of the server, the first shared key (which may also become a root key) of the second terminal device used for authentication with the second terminal device.

For example, the server generates, according to the received DH public key of the second terminal device, that is, $A=g^{RAND\ 1}$ mod p, and the random number RAND 2 used by the server to generate the DH public key, that is, $B=g^{RAND\ 2}$ mod p, a shared key used to perform authentication between the server and the second terminal device, that is, $K_D=A^{RAND\ 2}$ mod p.

108. The server sends a second message to the first terminal device.

The second message includes the DH public key of the server and the second ID of the second terminal device.

If a plurality of second terminal devices need to simultaneously obtain, from the server by using the first terminal device, a credential used for authentication with the server, the second message includes a second ID of each second terminal device of the plurality of second terminal devices that is generated by the server for the second terminal device, and the DH public key of the server.

109. The first terminal device receives the second message that is sent by the server based on the first message.

110. The first terminal device sends the second ID of the second terminal device and the DH public key of the server to the second terminal device.

After receiving the second message sent by the server, the first terminal device may send the second ID of the second terminal device and the DH public key of the server that are in the first message to the second terminal device.

If the second message includes a second ID of each second terminal device of a plurality of second terminal devices, the first terminal device sends the second ID of the second terminal device and the DH public key of the server to the second terminal device, so that the second terminal device may receive the second ID of the second terminal device and the DH public key of the server; or, the first terminal device may directly send second IDs of all second terminal devices and the DH public key of the server that are in the second message to each second terminal device, so that after receiving the second IDs of all of the second terminal devices, the second terminal device independently determines a second ID of the second terminal device in the second IDs.

111. The second terminal device receives the second ID of the second terminal device and the DH public key of the server that are sent by the first terminal device.

112. The second terminal device determines the first shared key according to the first random number of the second terminal device and the DH public key of the server.

For example, after receiving the DH public key of the server and the second ID of the second terminal device that are sent by the first terminal device, the second terminal device may determine, according to the DH public key of the server in the first message, and the first random number used by the second terminal device when generating the DH public key of the second terminal device, the first shared key of the second terminal device used for authentication with the server.

For example, the second terminal device generates, according to the received DH public key of the server, that is, $B=g^{RAND\ 2}$ mod p, and the random number RAND 1 used by the second terminal device when generating the DH public key, that is, $A=g^{RAND\ 1}$ mod p, a shared key used to perform authentication between the second terminal device and the server, that is, $K_D=B^{RAND\ 1}$ mod p.

It should be understood that, if a plurality of second terminal devices obtain, from the server by using the first terminal device, shared keys and second IDs used for network authentication, because respective public keys of different second terminal devices are different, the shared keys that are used for authentication with the different second terminal devices and that are determined by the server according to the second random number of the server and the DH public keys of the different second terminal devices are also different. Additionally, the second IDs that are generated by the server for the different second terminal devices are also different. To be specific, a shared key and a second ID that are used when authentication between any second terminal device and the server is performed are unique.

113. The second terminal device performs mutual authentication with the server according to the first shared key and the second ID of the second terminal device.

It may be learned that, the shared key, that is, $K_D=A^{RAND\ 2}$ mod p determined by the server in 107 is the same as the shared key $K_D=B^{RAND\ 1}$ mod p determined by the second terminal device in 112. To be specific, $K=A^b$ mod $p=(g^a$ mod $p)^b$ mod $p=g^{ab}$ mod $p=(g^b$ mod $p)^a=B^a$ mod p. Moreover, the shared key is learned by only the second terminal device and the server. Therefore, the second terminal device may perform authentication between the second terminal device and the server by using the shared key and the second ID of the second terminal device, thereby accessing the operator network.

Therefore, in this embodiment of this application, a terminal device not having a credential pre-issued by an operator may obtain, from the server in a DH key exchange manner by using another terminal device holding a credential, a shared key used for authentication with an operator network, thereby accessing the network.

It should be understood that, authentication between the second terminal device and the server may also be referred to as authentication between the second terminal device and the operator network (which is alternatively referred to as a core network, a network, or the like), and a key of the server may also be referred to as a network-side public key. Different operator networks have different IDs, and a plurality of servers in any operator network have respective IDs or a plurality of servers share an ID. Each server is configured to provide a service to a network operator to which the server belongs, for example, implement an authentication related operation.

According to the mobile network authentication method described above, when not having a credential pre-issued by the operator, for example, a shared key and an ID that is used to identify the subscription user, the second terminal device can obtain, from the server in the DH key exchange manner by using the first terminal device that subscribes, a credential used for authentication with the operator network.

Before the first terminal device sends the first message to the server, to be specific, 104 is performed, and/or before the server sends the second message to the first terminal device, to be specific, 108 is performed, the first terminal device may further perform particular processing on all or some content in the first message and/or all or some content in the second message to improve security of a transmission process. The following three manners are described in this embodiment of this application.

Manner 1

For the first message, before the first terminal device sends the first message to the server, to be specific, 104, the method may further include 1401. In this case, 104 may be replaced with 1042.

1401. The first terminal device generates a message authentication code (MAC) of the first message for the first message according to a second shared key.

1042. The first terminal device sends the first message and the MAC of the first message to the server.

The second shared key is used for authentication between the first terminal device and the server. To be specific, the second shared key is a shared key (which may also be referred to as a session key) used by the first terminal device to perform verification with the server.

Specifically, to prove that the first message is from a reliable source and is not tampered, when sending the first message to the server, the first terminal device may generate a message authentication code (MAC) such as $MAC1_K$ for the first message according to the second shared key. Only if the server verifies $MAC1_K$ after receiving the first message, the server trusts the first message.

In this case, 105 may be replaced with 1051, and the method further includes 1052.

1051. The server receives the first message sent by the first terminal device, and the message authentication code (MAC) of the first message generated by the first terminal device for the first message according to the second shared key.

1052. The server verifies the MAC of the first message according to the second shared key.

For example, the server verifies the MAC of the first message according to the second shared key, and if the server verifies the MAC of the first message, indicating that the first message is from a reliable source and is not tampered, the server accepts the first message, and 106 may be performed.

For the second message, before the server sends the second message to the first terminal device, to be specific, 108 is performed, the method further includes 1081. In this case, 108 may be replaced with 1082.

1081. The server generates a MAC of the second message for the second message according to the second shared key.

1082. The server sends the second message and the MAC of the second message to the first terminal device.

The second shared key is used for authentication between the first terminal device and the server.

For example, to prove that the second message is from a reliable source and is not tampered, when sending the second message to the first terminal device, the server may generate a message authentication code (MAC) such as $MAC2_K$ for the second message according to the second shared key, and only if the $MAC2_K$ received by the first terminal device is verified, the server trusts the second message, and continues to send the second message to the second terminal device.

In this case, 109 may be replaced with 1091, and the method further includes 1092.

1091. The first terminal device receives the second message sent by the server, and the MAC of the second message generated by the server for the second message according to the second shared key.

1092. The first terminal device verifies the MAC of the second message according to the second shared key.

For example, the first terminal device verifies the MAC of the second message according to the second shared key, and if the first terminal device verifies the MAC of the second message, indicating that the second message is from a reliable source and is not tampered, the first terminal device accepts the second message, and 110 is performed.

Therefore, in the manner 1, in a process of information exchange between the server and a terminal device, message verification performed on a message can ensure that a source of the message is reliable and the message is not tampered in a transmission process, thereby improving security of a key exchange process.

Manner 2

Before the server sends the second message to the first terminal device, to be specific, 108 is performed, the method further includes 1083. In this case, 108 may be replaced with 1084.

1083. The server signs the second message.

1084. The server sends, to the first terminal device, the second message, a signature message that is obtained after the server signs the second message, and a verification message corresponding to the signature message.

For example, to improve security of a process of transmitting the second message, the server signs the second message by using a private key of the server, and sends, to the first terminal device, the second message, a signature message that is obtained after the server signs the second message, and a verification message corresponding to the signature message. Even if the first terminal device is cracked or controlled, a man-in-the-middle attack cannot be initiated.

It should be understood that, the manner 1 and the manner 2 may be performed simultaneously. To be specific, the server may sign the second message and generate a message authentication code for the second message simultaneously. However, to reduce signaling, if the manner 2 is performed, the manner 1 may be not performed.

In this case, 109 to 111 may be replaced with 1111 to 1113, and the method may further include 1114.

1111. The first terminal device receives, from the server, the second message, the signature message that is obtained after the server signs the second message, and the verification information corresponding to the signature message.

1112. The first terminal device sends the second message, the signature message, and the verification information to the second terminal device.

1113. The second terminal device receives the second message, the signature message obtained after the server signs the second message, and the verification information corresponding to the signature message, where the second message, the signature message, and the verification information are sent by the first terminal device.

1114. The second terminal device verifies the second message according to the second message, the signature message, and the verification information.

For example, the second terminal device verifies the second message according to the second message, the signature message, and the verification information. If the second terminal device verifies the second message, indicating that the second message is actually reliably derived from the server and content of the second message is integral, the second terminal device accepts the second message, and 112 is performed.

Optionally, the verification information may include a certificate of the server or an ID of the server.

For example, if the server uses a certificate-based key mechanism, the verification information may be the certificate of the server, that is, a certificate corresponding to a private key used by the server to encrypt the second message, so that the second terminal device can verify the signature according to the certificate; or if the server uses an identity-based key mechanism, the verification information may be the ID of the server, so that the second terminal device can verify the signature according to the ID of the server.

Therefore, in the manner 2, the server may sign, by using an asymmetric key mechanism (for example, a certificate-based cryptography or an identity-based cryptography), the to-be-sent DH public key of the server and the identity that is used to identify the subscription user and that is generated for a terminal device. Therefore, security of a key exchange process is improved. Even if the terminal device is cracked or controlled, a man-in-the-middle attack cannot be initiated.

Manner 3

For the first message, before the first terminal device sends the first message to the server, to be specific, 104, the method may further include 1403.

1403. The first terminal device encrypts the DH public key of the second terminal device and the first ID of the second terminal device according to the second shared key.

The second shared key is used for authentication between the first terminal device and the server. To be specific, the second shared key is a shared key used by the first terminal device to perform verification with the server.

In this case, the DH public key of the second terminal device and the first ID of the second terminal device that are in the first message sent by the first terminal device to the server in 104 are encrypted by the first terminal device by using the second shared key, and the DH public key of the second terminal device and the first ID of the second terminal device that are in the first message received by the server from the first terminal device in 105 are encrypted by the first terminal device.

In this case, before 106, the method further includes 1061, and 106 may be replaced with 1062.

1061. The server decrypts the encrypted DH public key of the second terminal device and the encrypted first ID of the second terminal device according to the second shared key.

1062. The server determines, according to the decrypted DH public key of the second terminal device and the DH public key of the server, the first shared key of the second terminal device used for authentication with the second terminal device, and generates the second ID of the second terminal device for the second terminal device.

For the second message, before the server sends the second message to the first terminal device, to be specific, 108, the method may further include 1081.

1081. The server encrypts the DH public key of the second terminal device and the second ID of the second terminal device according to the second shared key.

The second shared key is used for authentication between the first terminal device and the server.

In this case, the DH public key of the second terminal device and the second ID of the second terminal device that are in the first message sent by the server to the first terminal device in 108 are encrypted by the server by using the second shared key, and the second ID of the second terminal device and the DH public key of the server that are in the second message received by the first terminal device from the server in 109 are encrypted by the server.

In this case, before 110, the method further includes 1101, and 110 may be replaced with 1102.

1101. The first terminal device decrypts the encrypted second ID of the second terminal device and the encrypted DH public key of the server according to the second shared key.

1102. The first terminal device sends the decrypted second ID of the second terminal device and the decrypted DH public key of the server to the second terminal device.

Therefore, in the manner 3, in a process of information exchange between the server and a terminal device, encryption performed on a message improves security of a key exchange process between the server and the terminal device.

After the second terminal device not having a credential pre-issued by the operator network obtains a credential used to access the operator network according to the foregoing mobile network authentication method, the first shared key may be further verified between the second terminal device and the server, to ensure that the first shared key determined by the server is consistent with the first shared key determined by the second terminal device. Optionally, in a process interaction diagram of verifying a shared key according to an embodiment of this application shown in FIG. 9, before 113, the method may further include 114 to 118.

114. The second terminal device generates a message authentication code (MAC) for the second ID of the second terminal device according to the first shared key.

115. The second terminal device sends the second ID and the MAC of the second ID to the server.

116. The server receives the second ID and the MAC of the second ID, and verifies the MAC of the second ID of the second terminal device according to the first shared key. If the MAC of the second ID of the second terminal device is verified, 117 is performed.

117. The server sends a provision complete message to the second terminal device, and a MAC of the provision complete message generated by the server for the provision complete message.

118. The second terminal device receives the provision complete message sent by the server and the MAC of the provision complete message, and verifies the MAC of the provision complete message according to the first shared key. If the MAC of the provision complete message is verified, 113 may be performed.

Therefore, message authentication performed between the second terminal device and the server can ensure that the first shared key determined by the server is consistent with the first shared key determined by the second terminal device.

Figure 10:
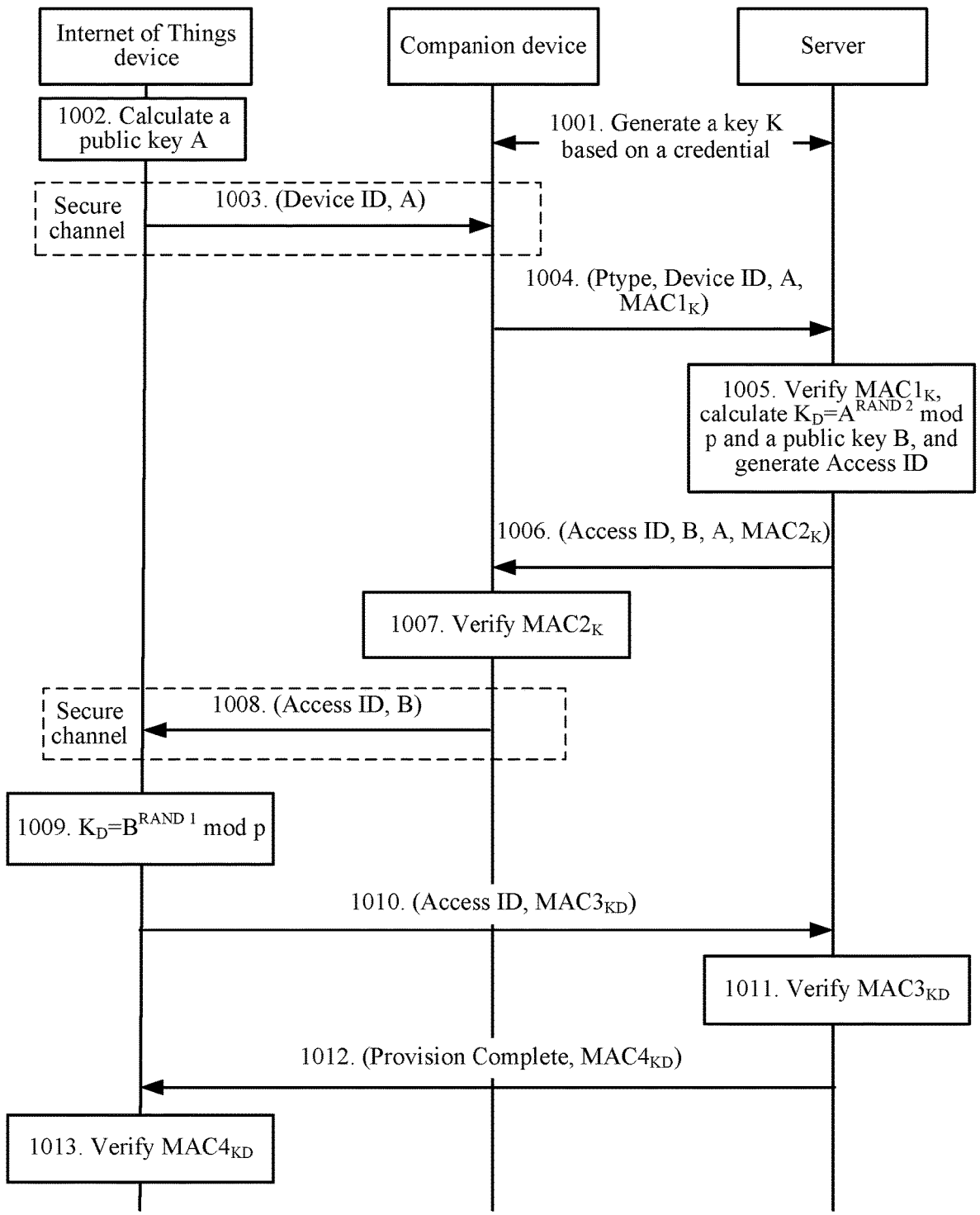
FIG. 10 is a process interaction diagram of a mobile network authentication method according to an embodiment of this application.

The mobile network authentication method according to the embodiments of this application is described in detail below with reference to FIG. 10 and FIG. 11. FIG. 10 shows a mobile network authentication method according to an embodiment of this application. FIG. 10 shows a process in which a second terminal device obtains a credential of an operator by using a first terminal device. The method includes the following steps.

1001. The first terminal device (Companion UE) performs mutual authentication with an operator network by using a 3GPP credential of the first terminal device, for example, performs authentication based on an AKA (Authentication and Key Agreement) protocol, where an authentication manner is not limited in this embodiment of this application, for example, the companion UE may alternatively perform mutual authentication with the operator network in an authentication manner in a future 5G network; and generates a session key K.

1002. The second terminal device such as an Internet of Things device (IoT Device) generates a random number such as RAND 1, and the IoT device calculates a DH public key $A=g^{RAND\ 1}$ mod p of the IoT device by using RAND 1, where p is a prime number, g is a generating element of a finite cyclic group G, and g and p may be publicized in advance or may be sent in a plaintext form.

1003. The IoT device establishes a secure channel with the companion UE, and sends an ID (Device ID) of the IoT device and the generated DH public key (A) to the companion UE on the secure channel, where a format of a message sent by the IoT device is, for example, (Device ID, A).

1004. After receiving this message, the companion UE adds a flag bit (PType) to the message, where this flag bit is used to indicate that a function of this message is to request the 3GPP credential for the IoT device. PType may indicate a request for a single device by using a particular value (for example, 1). Then, the companion UE generates a message authentication code $MAC1_K$ for the entire message by using the key K, and then sends the message to a server (Provision Server), where a format of a message sent by the companion UE is (Ptype, Device ID, A, $MAC1_K$). The server may be an HSS.

Optionally, the companion UE may further encrypt the message sent to the provision server. For example, a format of the message is (Ptype, m1, $MAC1_K$), where m1 is a ciphertext of Device ID and A that are encrypted by using the key K, to be specific, m1=En(Device ID, A, K).

1005. After receiving the message, the provision server first verifies $MAC1_K$ of the message. After $MAC1_K$ of the message is verified, a network-side random number such as RAND 2 is generated, thereby generating a network-side DH public key $B=g^{RAND\ 2}$ mod p, and a shared key $K_D$ is generated by using the received DH public key of the IoT device, that is, A, $K_D=A^{RAND\ 2}$ mod p, and an access identity (Access Identity, briefly referred to as Access ID) used to identify a subscription user is generated for the IoT device.

If the message received by the provision server is the encrypted message, that is, (Ptype, m1, $MAC1_K$), the encrypted message further needs to be decrypted according to K, so as to obtain Device ID and A.

1006. The provision server sends a message to the companion UE, where a format of the message is, for example, (Access ID, B, A, $MAC2_K$), where the access ID is an ID that is generated by the operator for the IoT device and that is used to access the operator, that is, an ID from the operator used to identify a subscription user. B is a DH public key of the provision server, A is the DH public key of the IoT device returned by the provision server, $MAC2_K$ is a message authentication code generated by the provision server for the entire message by using the key K.

Optionally, the provision server may further sign the message. In this case, a message format of the message sent by the provision server to the companion UE is, for example, (Access ID, B, A, $MAC2_K$, $Sig_{CN}$), where $Sig_{CN}$ is a signature performed by the provision server on the message by using a private key of the provision server.

Optionally, the provision server may further encrypt the message sent to the companion UE. In this case, a format of the message sent by the provision server is, for example, (m2, $MAC2_K$), where m2 is a ciphertext of Access ID, B, and A that are encrypted by using the key K, to be specific, m2=En(Access ID, A, B, A, K).

1007. After receiving this message, the companion UE verifies $MAC2_K$.

If the message received by the companion UE is the encrypted message, that is, (m2, $MAC2_K$), the companion UE further needs to decrypt the encrypted message according to K, so as to obtain Access ID, B, and A.

1008. After completing verification on $MAC2_K$, the companion UE sends the access ID and the network-side DH public key B to the IoT device on the secure channel, where a format of the message is, for example, (Access ID, B).

If the message further includes a signature of the provision server for the message, the companion UE also sends the signature and verification information corresponding to the signature (for example, a certificate of the server or an ID of the server) to the IoT device.

1009. After receiving the DH public key B of the server, the IoT device generates a shared key $K_D=B^{RAND\ 1}$ mod p, and stores the access ID.

If the IoT device further receives a signature of the server for the message and verification information corresponding to the signature, where the verification information is, for example, (Access ID, B, $Sig_{CN}$), the IoT device verifies the signature $Sig_{CN}$ according to the verification information, and may generate a shared key $K_D$ according to the DH public key B of the server when the signature $Sig_{CN}$ is verified.

1010. The IoT device sends the access ID to the provision server, and generates a message authentication code $MAC3_{KD}$ for the entire message by using the key $K_D$, where a format of the message is, for example, (Access ID, $MAC3_{KD}$).

1011. After receiving this message, the provision server verifies $MAC3_{KD}$.

1012. After verifying $MAC3_{KD}$, the provision server sends a provision complete message (Provision Complete) to the IoT device, and generates a message authentication code $MAC4_{KD}$ for the entire message by using the shared key $K_D$, where a format of the message is, for example, (provision complete, $MAC4_{KD}$), that is, (Provision Complete, $MAC4_{KD}$).

1013. After receiving this message, the IoT device verifies $MAC4_{KD}$. After $MAC4_{KD}$ is verified, the entire process ends.

1010 to 1013 are optional, and a main objective of 1010 to 1013 is to verify whether the key generated by the IoT device is consistent with the key generated by the server. After it is determined that the keys $K_D$ are consistent, the IoT device may perform authentication between the IoT device and the operator network by using the shared key $K_D$, thereby accessing the network.

A process in which one IoT device obtains a credential of an operator by using a companion UE is described above. A process in which a plurality of IoT devices obtain a credential of an operator by using a companion UE is described below with reference to a process interaction diagram of a mobile network authentication method according to an embodiment of this application shown in FIG. 11. Description is performed herein by using two IoT devices as an example. The method shown in FIG. 11 may be used for obtaining, by a plurality of second terminal devices, a credential of an operator by using a first terminal device. The method includes the following steps.

1101. The first terminal device (Companion UE) performs mutual authentication with an operator network by using a 3GPP credential of the first terminal device, for example, performs authentication based on an AKA (Authentication and Key Agreement) protocol, where an authentication manner is not limited in this embodiment of this application, for example, the companion UE may alternatively perform mutual authentication with the operator network in an authentication manner in a future 5G network; and generates a session key K.

1102. IoT devices generate random numbers respectively, and generate DH public keys of the IoT devices by using the random numbers, where 1102($a$): a terminal device such as an Internet of Things device 1 (IoT Device 1) generates a random number 1 such as RAND 1, and calculates a DH public key A1 of the Internet of Things device 1 by using RAND 1, where $A1=g^{RAND\ 1}$ mod p; a and 1102($b$): another terminal device such as an Internet of Things device 2 (IoT Device 2) generates a random number 2 such as RAND 2, and calculates a DH public key A2 of the Internet of Things device 2 by using RAND 2, where $A2=g^{RAND\ 2}$ mod p.

1103. The IoT devices send IDs of the IoT devices and the generated DH public keys to the companion UE on a secure channel, where 1103($a$): a message sent by the IoT device 1 is (Device ID1, A1), where Device ID1 is an ID of the IoT device 1, and A1 is a DH public key of the IoT device 1; and 1103($b$): a message sent by the IoT device 2 is (Device ID2, A2), where Device ID2 is an ID of the IoT device 2, and A2 is a DH public key of the IoT device 2.

1104. After receiving a message, the companion UE adds a flag bit PType to the message, where this flag bit is used to indicate that a function of this message is to request the 3GPP credential for an IoT device. PType herein may indicate a request for a plurality of devices by using a particular value (for example, 0). Then, the companion UE generates a message authentication code $MAC1_K$ for the entire message by using the key K, and then sends the message to a provision server), where a format of a message sent by the companion UE is, for example, (Ptype, Device ID1, Device ID2, A1, A2, $MAC1_K$).

Optionally, in this case, the companion UE may further encrypt the message sent to the provision server. In this case, the message sent by the companion UE to the provision server is, for example, (Ptype, m1, $MAC1_K$), where m1 is a ciphertext of Device ID and A that are encrypted by using the key K, to be specific, m1=En(Device ID 1, Device ID 2, A1, A2, K).

1105. After receiving the message, the provision server first verifies $MAC1_K$ of the message. After $MAC1_K$ is verified, a network-side random number RAND 3 is generated, a network-side DH public key $B=g^{RAND\ 3}$ mod p is generated, and a shared key is generated by using the received DH public key of the IoT device. To be specific, $K_{D1}=A1^{RAND\ 3}$ mod p and $K_{D2}=A2^{RAND\ 3}$ mod p. Moreover, an access ID 1 and an access ID 2 are generated for the IoT device 1 and the IoT device 2 respectively.

If the message received by the provision server is the encrypted message, that is, (Ptype, m1, $MAC1_K$), the encrypted message further needs to be decrypted according to K, so as to obtain Device ID 1, Device ID 2, A1, and A2.

1106. The provision server sends a message to the companion UE, where the message is, for example, (Access ID 1, Access ID 2, B, A1, A2, $MAC2_K$), where Access ID 1 and Access ID 2 are IDs that are used to identify subscription users and that are generated by the operator for the IoT device 1 and the IoT device 2 respectively, B is a DH public key of the provision server, A1 and A2 are respectively a DH public key of the IoT device 1 and a DH public key of the IoT device 2 that are returned by the provision server, and $MAC2_K$ is a message authentication code generated by the provision server for the entire message by using the key K.

Optionally, the provision server may further sign the message. In this case, a message sent by the HSS/provision server to the companion UE is, for example, (Access ID 1, B, A1, $Sig1_{CN}$, Access ID 2, B, A2, $Sig2_{CN}$, $MAC2_K$), where $Sig1_{CN}$ is a signature for (Access ID1, B, A1), and $Sig2_{CN}$ is a signature for (Access ID2, B, A2).

Optionally, the provision server may further encrypt the message sent to the companion UE. For example, the message format is, for example, (m2, $MAC2_K$), where m2 is a ciphertext of Access ID 1, Access ID 2, B, A1, and A2 that are encrypted by using the key K, to be specific, m2=En (Access ID 1, Access ID 2, B, A1, A2, K).

1107. After receiving this message, the companion UE verifies $MAC2_K$.

If the message received by the companion UE is the encrypted message, that is, (m2, $MAC2_K$), the companion UE further needs to decrypt the encrypted message according to K, so as to obtain Access ID 1, Access ID 2, B, A1, and A2.

1108. After completing verification on $MAC2_K$, the companion UE sends the access IDs and the network-side DH public key B to corresponding IoT devices respectively on the secure channel, where messages sent to the IoT device 1 and the IoT device 2 respectively are, for example:

1108($a$): send (Access ID 1, B) to the IoT device 1; and 1108($b$): send (Access ID 2, B) to the IoT device 2.

If the message further includes a signature of the provision server for the message, the companion UE also sends the signature and verification information corresponding to the signature (for example, a certificate of the server or an ID of the server) to the IoT device. For example, in 1109($a$), (Access ID 1, B, A1, $Sig1_{CN}$) is sent to the IoT device 1, and in 1109($b$), (Access ID 2, B, A2, $Sig2_{CN}$) is sent to the IoT device 2.

1109. After receiving the message, the IoT device generates a shared key by using the received network-side DH public key, where 1109($a$): the IoT device 1 generates a session key $K_{D1}=B^{RAND\ 1}$ mod p; and 1109($b$): the IoT device 2 generates a session key $K_{D2}=B^{RAND\ 2}$ mod p.

In this case, if the IoT device 1 and the IoT device 2 further respectively receive signatures of the server for the messages and verification information corresponding to the signatures, where formats of the verification information are, for example, (Access ID 1, B, A1, $Sig1_{CN}$) and (Access ID 2, B, A2, $Sig2_{CN}$), the IoT device 1 and the IoT device 2 further need to respectively verify the signatures $Sig1_{CN}$ and $Sig2_{CN}$ according to the verification information. When verifying the signatures, the IoT device 1 and the IoT device 2 may respectively generate the shared keys $K_{D1}$ and $K_{D2}$ according to the DH public key B of the server.

1110. The IoT device sends the access ID to the HSS/provision server, and generates a message authentication code for the entire message by using the key of the IoT device, where messages respectively sent by the IoT device 1 and the IoT device 2 are, for example:

1110($a$), the IoT device 1 sends (Access ID 1, $MAC3_{KD1}$) to the provision server; and 1110($b$), the IoT device 2 sends (Access ID 2, $MAC4_{KD2}$) to the provision server.

1111. After receiving the messages, the provision server verifies $MAC3_{KD1}$ and $MAC4_{KD2}$.

1112. After verifying the message authentication code, the provision server sends a provision complete message to the IoT device, and generates a message authentication code for the entire message by using the key, where the messages respectively sent to the IoT device 1 and the IoT device 2 are, for example:

1112(a): send (Provision Complete, MAC5$_{KD1}$) to the IoT device 1; and

1112(b): send (Provision Complete, MAC6$_{KD2}$) to the IoT device 2.

1113. After receiving this message, the IoT device verifies the message authentication code. After the message authentication code is verified, the entire process ends, where 1113(a): the IoT device 1 verifies MAC5$_{KD1}$; and 1113(b): the IoT device 2 verifies MAC6$_{KD2}$.

1110 to 1113 are optional, and a main objective of 1110 to 1113 is to verify whether the keys generated by the IoT device 1 and the IoT device 2 are consistent with the key generated by the server. After it is determined that the keys K$_D$ are consistent, the IoT device 1 and the IoT device 2 may perform authentication between the IoT device 1 and the operator network and between the IoT device 2 and the operator network respectively by using the shared keys K$_{D1}$ and K$_{D2}$ of the IoT device 1 and the IoT device 2, thereby accessing the network.

According to the mobile network authentication method described above, the obtaining, by the second terminal device, a credential of the operator from the server by using the first terminal device is based on a condition that the first terminal device is a device authenticated with the server, to be specific, the first terminal device is a device holding a shared key used to perform a session with the network. Another situation is considered: how the second terminal device should obtain a credential of the operator from the server by using the first terminal device if the first terminal device still has not performed authentication with the server.

This embodiment of this application proposes that a possibility of obtaining a credential of a network operator is provided to the second terminal device in a process in which the first terminal device performs authentication with the server. To be specific, the second terminal device may obtain a credential of the operator in the process in which the first terminal device performs authentication with the server.

Figure 12:
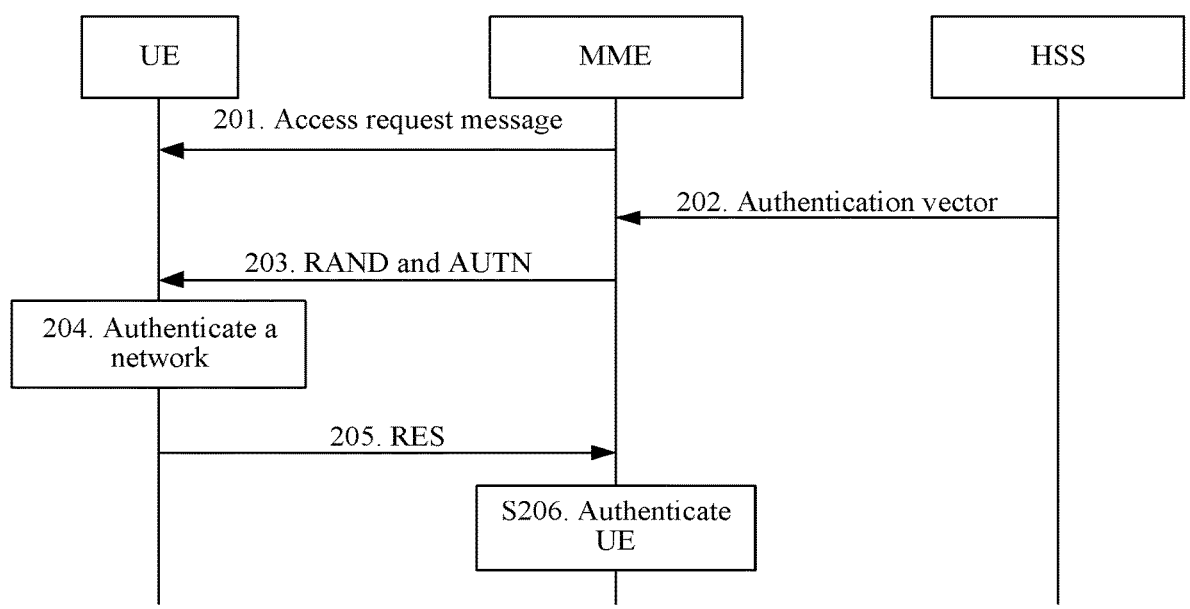
FIG. 12 is a schematic flowchart of an AKA-based authentication method in the prior art.

How to perform authentication between a first terminal device and a server in the prior art is first described briefly. FIG. 12 is a schematic flowchart of an AKA-based authentication method in the prior art. Description is performed by using UE, a mobility management entity (MME), and an HSS as an example. As shown in FIG. 12, the method includes the following steps.

201. The UE sends an access request message to the MME.

202. The MME obtains an authentication vector (or authentication data) from the HSS based on the access request message, where the authentication vector includes a random number (RAND), an expected response (XRES), and an authentication token (AUTN), and the authentication vector may also be referred to as an authentication vector.

203. The MME sends RAND and AUTN in the authentication vector to the UE, retains XRES, and waits for a response (RES) of the UE, where when RES sent by the UE is the same as XRES retained by the MME, it is considered that the UE is authenticated.

204. The UE authenticates a network based on RAND and AUTN that are received.

Specifically, the UE checks AUTN based on a shared key K pre-issued by the network, calculates an anonymity key (AK) by using RAND and K, then restores a sequence (SQN) by using AK, and verifies whether the SQN is valid. Then, an expected message authentication code (XMAC) is calculated by using the obtained valid SQN, RAND, and an authentication management field (AMF) that is stored in an ISIM, and if the XMAC is consistent with a message authentication code MAC that is calculated by the HSS and that is obtained from AUTN, check succeeds, and it is considered that the authentication data is sent from a home network.

205. After authenticating the network, the UE calculates a response (RES) by using RAND and Key0, and sends RES to the MME.

206. The MME checks received RES and an expected response (XRES) that is stored in the MME, where if the two parameters are consistent, it is considered that the terminal is authenticated.

It should be understood that, the foregoing listed specific processes of the authentication process are only examples of description, and should not constitute any limitation on this application. For the following described process of performing authentication between a first terminal device and a server, refer to 201 to 206. For brevity, details are not described again. Only a process in which a second terminal device obtains a credential in an embodiment of this application is correspondingly described.

It should be further understood that, the following listed core network devices such as a network authentication entity and a server are only examples of description, and should not constitute any limitation on this application. For example, in a 4G network, the network authentication entity may be a mobility management entity (MME), and the server may be a home subscriber server (HSS). The MME and the HSS that are listed herein are only an example of the network authentication entity and the server. This application does not exclude a case in which another core network element that has a same or similar function and that is defined in a future 5G is configured to perform an authentication method according to an embodiment of this application.

Figure 13:
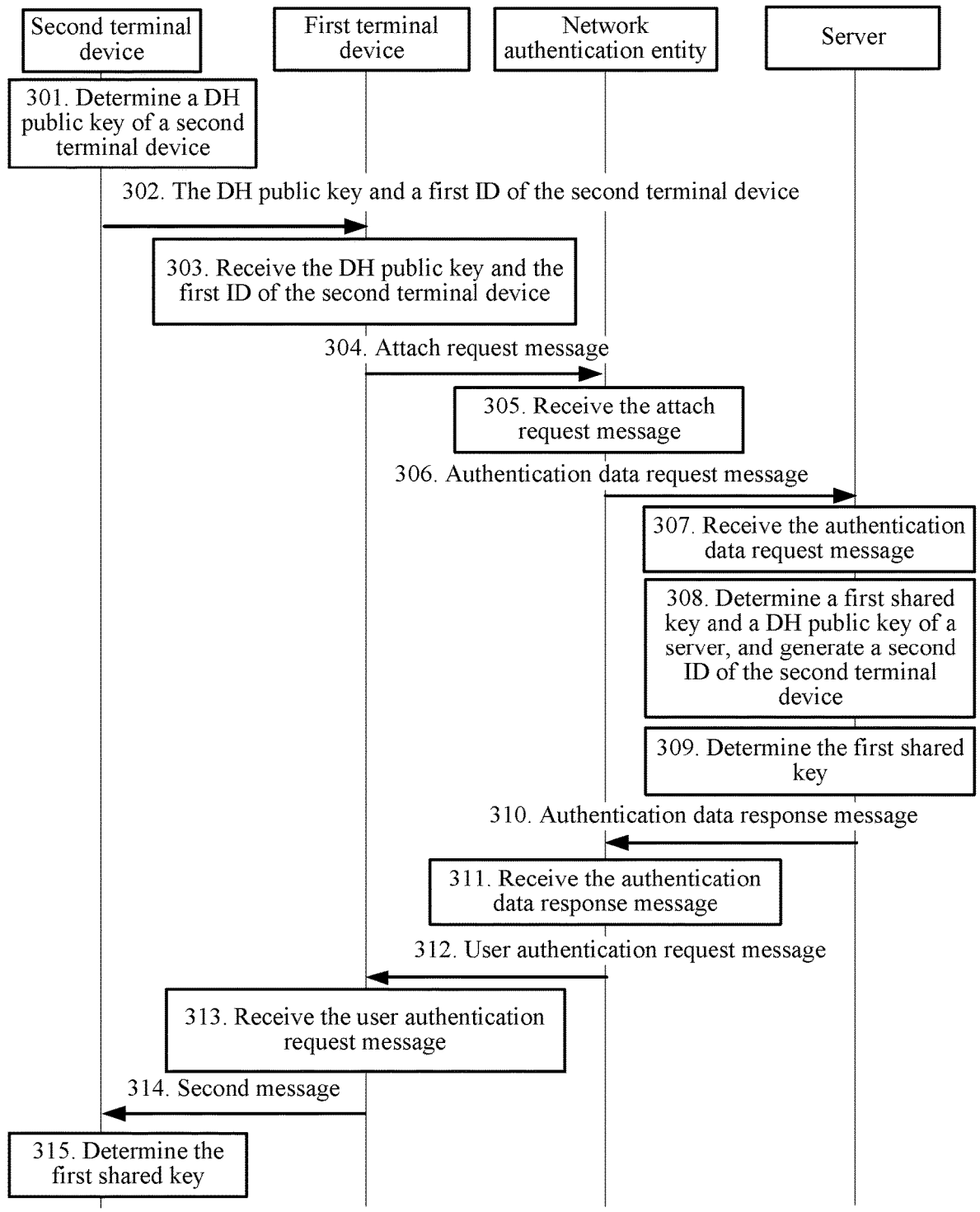
FIG. 13 is a process interaction diagram of a mobile network authentication method according to an embodiment of this application.

FIG. 13 is a process interaction diagram of a mobile network authentication method according to an embodiment of this application. FIG. 13 shows a first terminal device, a second terminal device, a network authentication entity, and a server. One second terminal device is used as an example. As shown in FIG. 13, the method includes the following steps.

301. The second terminal device determines a DH public key of the second terminal device.

The second terminal device is a device not holding a shared key. To be specific, the second terminal device does not have a credential pre-issued by an operator, and cannot implement authentication between the second terminal device and the server to access an operator network.

For example, the second terminal device and the server may obtain a shared key in a Diffie-Hellman key negotiation manner between each other by using the first terminal device. To be specific, under a condition that the first terminal device has a credential of an operator, the second terminal device and the server negotiate a shared key used for network authentication according to a DH key exchange method.

For example, the second terminal device may generate a random number such as RAND 1. The second terminal device calculates a DH public key, recorded as A herein, of the second terminal device according to RAND 1, where A=g$^{RAND\ 1}$ mod p.

302. The second terminal device sends the DH public key and a first ID of the second terminal device to the first terminal device.

For example, a format of the message sent by the second terminal device to the first terminal device may be (Device ID, A), where Device ID is the first ID of the second terminal device, A is the DH public key obtained by performing DH calculation, by the second terminal device, according to the random number RAND 1 generated by the second terminal device, and $A=g^{RAND\ 1} \bmod p$.

Further, the second terminal device may establish a secure channel with the first terminal device, for example, establish a secure channel in a short range communication manner such as a Bluetooth pairing technology, an encryption access control technology of a Wi-Fi local area network, or a wired manner, and send the first ID of the second terminal device and the generated public key to the first terminal device on the secure channel.

303. The first terminal device receives the DH public key and the first ID of the second terminal device that are sent by the second terminal device.

A format of the received message that is sent by the second terminal device and that is received by the first terminal device is, for example, (Device ID, A). Further, the first terminal device may receive, on the secure channel, the DH public key of the second terminal device and the first ID of the second terminal device that are sent by the second terminal device.

304. The first terminal device sends an attach request message that is alternatively referred to as an authentication request message to the network authentication entity.

The attach request message (Attach Request) includes a first message and an identity ID of the first terminal device, and the first message includes the DH public key of the second terminal device and the first ID of the second terminal device.

Optionally, the first message further includes indication information, and the indication information is used to indicate that the first message is used to request the shared key of the second terminal device and the second ID of the second terminal device for the second terminal device. The identity ID of the first terminal device is an ID that is used to identify a subscription user and that is allocated by the server to the first terminal device, and may be, for example, an IMSI number of the first terminal device.

For example, the indication information is used to indicate that a function of the first message is to request, for the second terminal device, a credential used for authentication between the second terminal device and the server. For example, the credential may include a shared key between the second terminal device and the server, and the second ID that is used to identify the subscription user and that is generated by the server for the second terminal device, and the second ID may be, for example, an IMSI. The indication information may be, for example, a flag bit, and the flag bit may be indicated, by using different values, as a credential that one second terminal device requests an operator to issue, or a credential that a plurality of second terminal devices request an operator to issue. When the first terminal device receives the first ID of the second terminal device and the DH public key of the second terminal device that are sent by the second terminal device, the first terminal device may add the indication information to the first message sent to the network authentication entity.

A format of a message of an authentication request initiated by the first terminal device to the network authentication entity such as an MME is, for example, (Ptype, IMSI, Device ID, A), where PType is a flag bit, and this flag bit is used to indicate that a function of this message is to request a 3GPP credential for an IoT device. PType may indicate, by using different values, a request for a single device or a request for a plurality of devices. For example, Ptype=1 is used herein to indicate that a 3GPP credential is requested for a single device, where an IMSI is from a 3GPP credential of the first terminal device.

305. The network authentication entity receives the attach request message sent by the first terminal device.

A format of the attach request message that is sent by the first terminal device and that is received by the network authentication entity is, for example, (Ptype, IMSI, Device ID, A).

306. The network authentication entity sends an authentication data request message (Authentication Data Request) to the server.

The attach request message includes the first message and the identity ID of the first terminal device, and the first message includes the DH public key of the second terminal device and the first ID of the second terminal device.

A format of the authentication data request message sent by the network authentication entity to the server is, for example, (Ptype, IMSI, SN ID, Network Type, Device ID, A), where SN ID is an ID of a service network, and Network Type is a network type.

307. The server receives the authentication data request message sent by the network authentication entity.

A format of the authentication data request message that is sent by the network authentication entity and that is received by the server is, for example, (Ptype, IMSI, SN ID, Network Type, Device ID, A).

308. The server determines a DH public key of the server according to a second random number, generates a second ID of the second terminal device for the second terminal device, and determines a first shared key.

For example, the server may generate the second random number, and determine the DH public key of the server according to the second random number, and therefore may generate, according to the second random number and the received DH public key of the second terminal device, the first shared key of the second terminal device used for authentication with the second terminal device. Moreover, the server may transfer the public key of the server to the second terminal device, so that the second terminal device may determine, according to the DH public key of the server and the DH public key of the second terminal device, a same first shared key used for authentication with the server.

For example, the server may generate a random number such as RAND 2. The server calculates a DH public key, recorded as B herein, of the server according to RAND 2, and $B=g^{RAND\ 2} \bmod p$. Moreover, the server generates a first shared key $K_D=A^{RAND\ 2} \bmod p$ by using the received DH public key of the second terminal device, and generates a second ID (Access ID) of the second terminal device for the second terminal device.

309. The server determines an authentication vector based on the authentication data request message.

In this case, the server may generate another random number such as RAND 3, and determine an authentication vector (Auth. Vector), where the authentication vector includes authentication data related to authentication.

310. The server sends an authentication data response message to the network authentication entity.

The authentication data response message (Authentication Data Response) includes the second message and the authentication vector, and the second message includes the DH public key of the server and the second ID of the second terminal device that is generated by the server for the second terminal device.

A format of the authentication data response message sent by the server to the network authentication entity is, for example, (EPS Auth. Vector, Access ID, B, A).

311. The network authentication entity receives the authentication data response message sent by the server.

A format of the authentication data response message that is sent by the server and that is received by the network authentication entity is, for example, (EPS Auth. Vector, Access ID, B, A).

312. The network authentication entity sends a user authentication request message to the first terminal device.

The user authentication request message (User Authentication Request) includes the second message and the authentication data in the authentication vector.

A format of the user authentication request message sent by the network authentication entity to the first terminal device is, for example, (RAND 3, $AUTN_{HSS}$, Access ID, B, A), where $AUTN_{HSS}$ is an authentication token (Authentication Token).

313. The first terminal device receives the user authentication request message sent by the network authentication entity.

A format of the user authentication request message that is sent by the network authentication entity and that is received by the first terminal device is, for example, (RAND 3, $AUTN_{HSS}$, Access ID, B, A). After receiving the user authentication request message, the first terminal device calculates an authentication response Auth. Res., and compares $AUT_{HUE}$ with $AUTH_{HSS}$ to determine whether $AUT_{HUE}$ is the same as $AUTH_{HSS}$. If $AUT_{HUE}$ is the same as $AUTH_{HSS}$, the first terminal device considers that the authentication data is sent from a home network, and 314 is performed.

314. The first terminal device sends the second ID of the second terminal device and the DH public key of the server to the second terminal device.

After receiving the user authentication request message sent by the network authentication entity, the first terminal device sends, to the second terminal device, the second ID of the second terminal device and the DH public key of the server that are in the second message in the user authentication request message. A format of the second message is, for example, (Access ID, B).

315. The second terminal device receives the second ID of the second terminal device and the DH public key of the server that are sent by the first terminal device.

316. The second terminal device determines the first shared key according to the first random number of the second terminal device and the received DH public key of the server.

Specifically, after receiving the DH public key of the server and the second ID of the second terminal device that are sent by the first terminal device, the second terminal device may determine, according to the DH public key of the server in the first message, and the first random number used by the second terminal device when generating the DH public key of the second terminal device, the first shared key of the second terminal device used for authentication with the server.

For example, the second terminal device determines, according to the received DH public key of the server, that is, $B=g^{RAND\ 2}$ mod p, and the first random number RAND 1 used to generate the DH public key of the second terminal device, that is, $A=g^{RAND\ 1}$ mod p, a shared key used to perform authentication between the second terminal device and the server, that is, $K_D=B^{RAND\ 1}$ mod p.

It may be learned that, the shared key, that is, $K_D=A^{RAND\ 2}$ mod p determined by the server in 309 is the same as the shared key $K_D=B^{RAND\ 1}$ mod p determined by the second terminal device in 315. To be specific, $K=A^b$ mod $p=(g^a$ mod $p)^b$ mod $p=g^{ab}$ mod $p=(g^b$ mod $p)^a=B^a$ mod p. Moreover, the shared key is learned by only the second terminal device and the server. Therefore, the second terminal device may subsequently perform authentication between the second terminal device and the server by using the shared key and the second ID of the second terminal device, thereby accessing the operator network.

It should be noted that, after obtaining the shared key $K_D$, the second terminal device can perform, under a condition that the first terminal device is authenticated with the server, authentication with the server by using the shared key $K_D$, and may verify the obtained first shared key in a process in which the network authentication entity authenticates the first terminal device.

Figure 14:
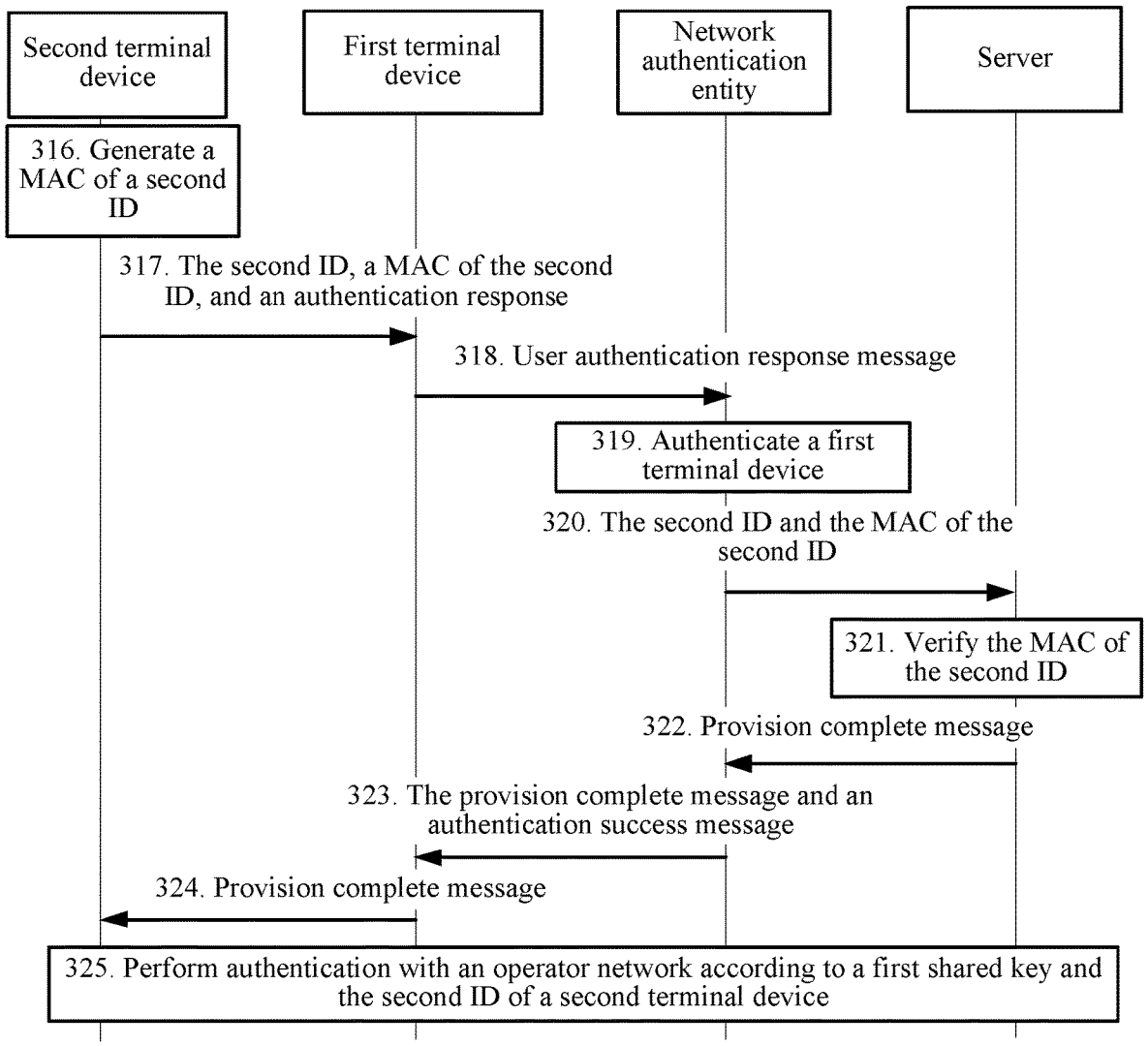
FIG. 14 is a process interaction diagram of a mobile network authentication method according to an embodiment of this application.

Optionally, in a process interaction diagram of a mobile network authentication method according to an embodiment of this application shown in FIG. 14, the method may further include 316 to 325.

316. The second terminal device generates a MAC for the second ID of the second terminal device.

After obtaining the first shared key of the second terminal device, the second terminal device may initiate a verification process to the first shared key, so as to ensure that the first shared key determined by the second terminal device is consistent with the shared key determined by the server. In this case, the second terminal device may generate the message authentication code MAC for the second ID by using the first shared key $K_D$.

317. The second terminal device sends the second ID of the second terminal device and the MAC of the second ID to the first terminal device.

A format of a message for the second ID and the MAC of the second ID that are sent by the second terminal device to the first terminal device is, for example, (Access ID, MAC).

318. The first terminal device receives the second ID of the second terminal device and the MAC generated for the second ID that are sent by the second terminal device, and sends a user authentication response message (User Authentication Response) to the network authentication entity based on the user authentication request message.

After receiving the second ID of the second terminal device and the MAC generated for the second ID that are sent by the second terminal device, the first terminal device sends the user authentication response message to the network authentication entity, where a format of the user authentication response message is, for example, (Access ID, MAC, RES.).

319. The network authentication entity receives the user authentication response message sent by the first terminal device, and determines, according to the authentication response message, whether authentication succeeds.

A format of the user authentication response message that is sent by the first terminal device and that is received by the network authentication entity is, for example, (Access ID, MAC, RES.). Then, the network authentication entity compares RES with XRES to determine whether RES is equal to XRES. If RES is equal to XRES, the network authentication entity completes authentication on the first terminal device, and generates an authentication success message (Auth. Success), and 320 is performed.

320. The network authentication entity sends the second ID of the second terminal device and the MAC of the second ID of the second terminal device to the server.

After completing authentication, the network authentication entity sends the second ID of the second terminal device and the MAC of the second ID of the second terminal device to the server, where a format of the message is, for example, (Access ID, MAC).

321. The server verifies the MAC of the second ID of the second terminal device according to the first shared key.

After receiving the second ID of the second terminal device and the MAC of the second ID of the second terminal device, the server may authenticate the MAC of the second ID according to the first shared key. A format of the message received by the server is, for example, (Access ID, MAC). Then, the server may verify the MAC according to the first shared key $K_D$. If the server verifies the MAC of the second ID of the second terminal device, 320 is performed.

322. The server sends a provision complete message (Provision Complete) to the network authentication entity.

323. The network authentication entity receives the provision complete message sent by the server, and sends the provision complete message and the 318-based authentication success message to the first terminal device.

After receiving the provision complete message, the network authentication entity sends the provision complete message and the authentication success message that is generated in 318 together to the second terminal device, and a format of the message sent by the network authentication entity to the first terminal device is, for example, (Provision Complete, Auth. Success).

324. The first terminal device receives the provision complete message and the authentication success message that are sent by the network authentication entity, and sends the provision complete message to the second terminal device.

After receiving the provision complete message and the authentication success message, the first terminal device determines, according to the authentication success message, that the first terminal device is authenticated, and sends the provision complete message to the second terminal device, and a format of the message received by the first terminal device from the network authentication entity is, for example, (Provision Complete, Auth. Success). After the first terminal device sends Provision Complete to the second terminal device, the entire process ends.

325. The second terminal device performs authentication with an operator network according to the first shared key and the second ID of the second terminal device.

Figure 11:
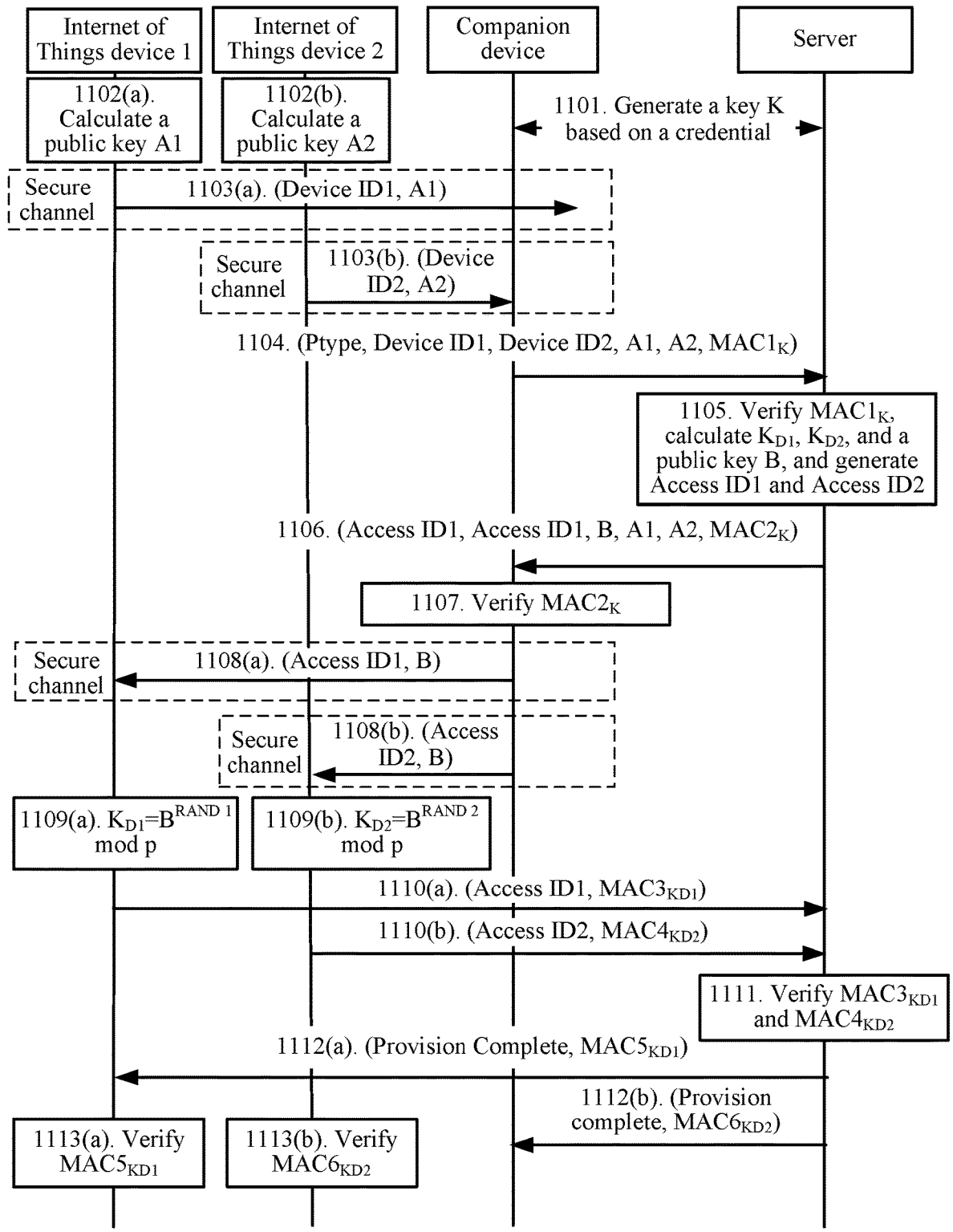
FIG. 11 is a process interaction diagram of a mobile network authentication method according to an embodiment of this application.

It should be understood that, in a case of a plurality of second terminal devices, for a specific process in which the plurality of second terminal devices obtain a credential of an operator by using the first terminal device in a process in which the first terminal device performs authentication with the server, refer to the description of FIG. 13 and the related description of FIG. 11. A process in which each second terminal device of the plurality of second terminal devices obtains a credential of the operator may be performed according to the method described in FIG. 13. For brevity, details are not described herein again.

Therefore, according to the mobile network authentication method according to this embodiment of this application, a terminal device not holding a credential pre-issued by an operator can obtain, from the server by using the first terminal device in a process in which the first terminal device performs authentication with the server, a credential used for authentication with the server. Therefore, even if the first terminal device has not performed authentication with the operator network, the first terminal device can still obtain a credential issued by the operator network.

It should be understood that sequence numbers of processes do not mean an execution order in an embodiment shown in each of the foregoing figures. The execution order of the processes should be determined according to functions and internal logic of the processes, and should not be construed as any limitation on the implementation processes of the embodiments of this application.

The mobile network authentication method according to the embodiments of this application is described in detail above with reference to FIG. 7 to FIG. 14. A terminal device, a server, and a network authentication entity according to the embodiments of this application are described in detail below with reference to FIG. 15 to FIG. 26. It should be understood that, the network device and the terminal device according to the embodiments of this application may perform various methods according to the foregoing embodiments of this application. To be specific, for specific operating processes of the following various devices, refer to corresponding processes in the foregoing method embodiments.

Figure 15:
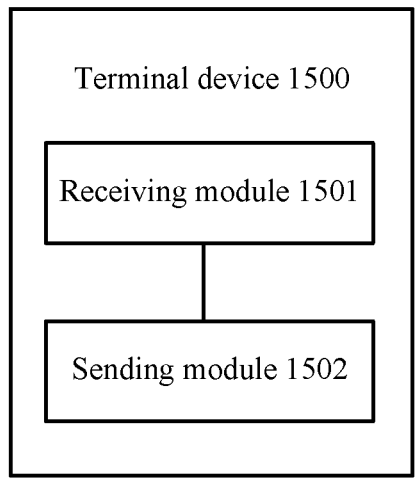
FIG. 15 is a schematic block diagram of a terminal device according to an embodiment of this application.

FIG. 15 is a schematic block diagram of a terminal device 1500 according to an embodiment of this application. As shown in FIG. 15, the terminal device 1500 is the first terminal device in the foregoing method embodiments of FIG. 7 to FIG. 11, the first terminal device is a device holding a shared key, and the first terminal device 1500 includes a receiving module 1501 and a sending module 1502.

The receiving module 1501 is configured to receive a Diffie-Hellman (DH) public key and a first identity (ID) that are sent by at least one second terminal device, where the at least one second terminal device is a device not holding a shared key.

The sending module 1502 is configured to send a first message to a server, where the first message includes a DH public key of each second terminal device of the at least one second terminal device and a first ID of the second terminal device.

The receiving module 1501 is further configured to receive a second message that is sent by the server based on the first message, where the second message includes a DH public key of the server and a second ID of the second terminal device that is generated by the server for the second terminal device, and the second ID is used to identify a subscription user.

The sending module 1502 is further configured to send the second ID of the second terminal device and the DH public key of the server to the second terminal device, so that the second terminal device determines, according to the second ID of the second terminal device and the DH public key of the server, a first shared key of the second terminal device and the second ID of the second terminal device that are used for authentication with the server.

Optionally, the first message further includes indication information, and the indication information is used to indicate that the first message is used to request the shared key of the second terminal device and the second ID of the second terminal device for the second terminal device.

Optionally, before the first terminal device sends the first message to the server, the first terminal device further includes:

a generation module, configured to generate a message authentication code (MAC) of the first message for the first message according to a second shared key, where the second shared key is used for authentication between the first terminal device and the server, where the sending module 1502 is specifically configured to: send the first message and the MAC of the first message to the server.

Optionally, the receiving module 1501 is specifically configured to: receive the second message sent by the server, and a MAC of the second message generated by the server for the second message according to the second shared key, where the sending module 1502 is specifically configured to: verify, by the first terminal device, the MAC of the second message according to the second shared key; and if the first terminal device verifies the MAC of the second message, send, by the first terminal device, the second ID of the second terminal device and the DH public key of the server to the second terminal device.

Optionally, the receiving module 1501 is specifically configured to: receive, from the server, the second message, a signature message of the second terminal device obtained after the server signs the second ID of the second terminal device and the DH public key of the server, and verification information of the second terminal device that is corresponding to the signature message of the second terminal device, where the sending module 1502 is specifically configured to: send the second ID of the second terminal device and the DH public key of the server, the signature message of the second terminal device, and the verification information of the second terminal device to the second terminal device.

Optionally, the verification message includes a certificate of the server or an ID of the server.

Optionally, before the sending module 1502 sends the first message to the server, the terminal device further includes:

an encryption module, configured to encrypt the DH public key of the second terminal device and the first ID of the second terminal device according to the second shared key, where the DH public key of the second terminal device and the first ID of the second terminal device that are in the first message sent by the sending module 1502 to the server are encrypted by the first terminal device.

Optionally, the second ID of the second terminal device and the DH public key of the server that are in the second message received by the receiving module 1501 from the server are encrypted by the server, where before the sending module 1502 sends the second ID of the second terminal device and the DH public key of the server to the second terminal device, the terminal device further includes:

a decryption module, configured to decrypt the encrypted second ID of the second terminal device and the encrypted DH public key of the server according to the second shared key; and the sending module 1502 is specifically configured to: send the decrypted second ID of the second terminal device and the decrypted DH public key of the server to the second terminal device.

Optionally, the server includes a home subscriber server HSS.

The terminal device 1500 according to this embodiment of this application may correspond to the first terminal device in the authentication methods according to the embodiments of this application in FIG. 7 to FIG. 11, and modules in the terminal device 1500 and the foregoing other operations and/or functions are respectively used to implement corresponding processes of the methods in FIG. 7 to FIG. 11. For brevity, details are not described herein again.

Therefore, the terminal device according to this embodiment of this application can establish, based on a credential of an operator held by the terminal device, a channel for key negotiation between a terminal device not holding a credential pre-issued by the operator and the server, so that the terminal device not having a credential pre-issued by the operator can also obtain, from the server, a shared key used for authentication with an operator network, thereby accessing the network.

Figure 16:
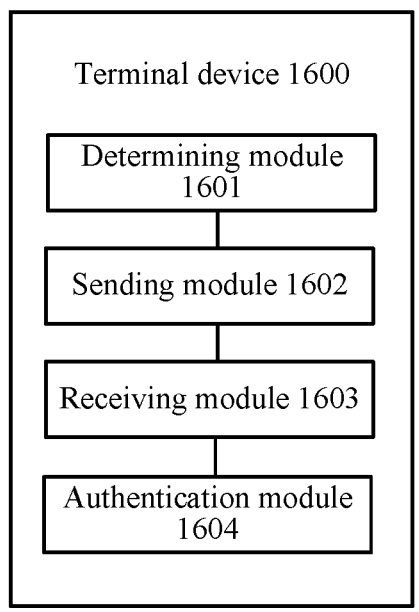
FIG. 16 is a schematic block diagram of a terminal device according to an embodiment of this application.

FIG. 16 is a schematic block diagram of a terminal device 1600 according to an embodiment of this application. As shown in FIG. 16, the terminal device 1600 is the second terminal device in the foregoing method embodiments of FIG. 7 to FIG. 11, the second terminal device is a device not holding a shared key, and the second terminal device 1600 includes a determining module 1601, a sending module 1602, a receiving module 1603, and an authentication module 1604.

The determining module 1601 is configured to determine a Diffie-Hellman (DH) public key of the second terminal device according to a first random number.

The sending module 1602 is configured to send a first message to a first terminal device, where the first message includes the DH public key of the second terminal device and a first identity ID of the second terminal device, and the first terminal device is a device holding a shared key.

The receiving module 1603 is configured to receive a second message that is sent by the first terminal device based on the first message, where the second message includes a DH public key of a server, and a second ID that is generated by the server for the second terminal device, and the second ID is used to identify a subscription user.

The determining module 1601 is further configured to determine a first shared key according to the first random number and the DH public key of the server.

The authentication module 1604 is configured to perform mutual authentication with the server according to the first shared key and the second ID.

Optionally, the receiving module 1603 is specifically configured to: receive the second message, a signature message obtained after the server signs the second message, and verification information corresponding to the signature message, where the second message, the signature message, and the verification information are sent by the first terminal device; and the determining module 1601 is specifically configured to: verify the second message according to the second message, the signature message, and the verification information; and if the second message is verified, determine, by the second terminal device, the first shared key according to the first random number and the DH public key of the server.

Optionally, the verification message includes a certificate of the server or an ID of the server.

Optionally, the terminal device further includes a generation module and a verification module, and the generation module is configured to: generate a message authentication code MAC of the second ID for the second ID according to the first shared key;

the sending module 1602 is further configured to send the second ID and the MAC of the second ID to the server;

the receiving module 1603 is further configured to receive a provision complete message that is sent by the server based on the second ID and the MAC of the second ID, and a MAC of the provision complete message that is generated by the server for the provision complete message; and the verification module is configured to verify the MAC of the provision complete message according to the first shared key, where the authentication module 1604 is specifically configured to: if the verification module verifies the MAC of the provision complete message, perform, by the second terminal device, mutual authentication with the server according to the first shared key and the second ID.

The terminal device 1600 according to this embodiment of this application may correspond to the second terminal device in the authentication methods according to the embodiments of this application in FIG. 7 to FIG. 11, and modules in the terminal device 1600 and the foregoing other operations and/or functions are respectively used to implement corresponding processes of the methods in FIG. 7 to FIG. 11. For brevity, details are not described herein again.

Therefore, in this embodiment of this application, a terminal device not having a credential pre-issued by an operator may obtain, from the server in a DH key exchange manner by using another terminal device holding a credential, a shared key used for authentication with an operator network, thereby accessing the network.

Figure 17:
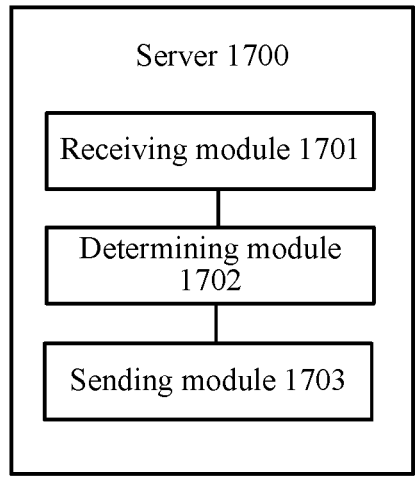
FIG. 17 is a schematic block diagram of a server according to an embodiment of this application.

FIG. 17 is a schematic block diagram of a server 1700 according to an embodiment of this application. The server 1700 is the server in the foregoing method embodiments of FIG. 7 to FIG. 11. As shown in FIG. 17, the server 1700 includes a receiving module 1701, a determining module 1702, and a sending module 1703.

The receiving module 1701 is configured to receive a first message sent by a first terminal device, where the first message includes a DH public key of each second terminal device of at least one second terminal device and a first ID of the second terminal device that are received by the first terminal device from the second terminal device, the first terminal device is a device holding a shared key, and the at least one second terminal device is a device not holding a shared key.

The determining module 1702 is configured to determine a DH public key of the server according to a second random number and generate a second ID of the second terminal device for the second terminal device, where the second ID is used to identify a subscription user.

The determining module 1702 is further configured to determine, according to the DH public key of the second terminal device and the second random number, a first shared key of the second terminal device used for authentication with the second terminal device.

The sending module 1703 is configured to send a second message to the first terminal device, where the second message includes the DH public key of the server and the second ID of the second terminal device.

Optionally, the first message further includes indication information, and the indication information is used to indicate that the first message is used to request the shared key of the second terminal device and the second ID of the second terminal device for the second terminal device.

Optionally, the receiving module 1701 is specifically configured to: receive the first message sent by the first terminal device, and a message authentication code MAC of the first message generated by the first terminal device for the first message according to a second shared key, where the second shared key is used for authentication between the first terminal device and the server, where the determining module 1702 is specifically configured to: verify the MAC of the first message according to the second shared key; and if the MAC of the first message is verified, determine, according to the second random number and the DH public key of the server, the first shared key of the second terminal device used for authentication with the second terminal device.

Optionally, before the sending module 1703 sends the second message to the first terminal device, the server further includes: a generation module, configured to generate a MAC of the second message for the second message according to the second shared key, where the sending module 1703 is specifically configured to: send the second message and the MAC of the second message to the first terminal device.

Optionally, before the sending module 1703 sends the second message to the first terminal device, the server further includes:

a signature module, configured to sign the second ID of the second terminal device and the DH public key of the server, where the sending module 1703 is specifically configured to: send, to the first terminal device, the second message, a signature message of the second terminal device obtained after the server signs the second ID of the second terminal device and the DH public key of the server, and a verification message of the second terminal device that is corresponding to the signature message of the second terminal device.

Optionally, the verification message includes a certificate of the server or an ID of the server.

Optionally, the DH public key of the second terminal device and the first ID of the second terminal device that are in the first message received by the receiving module 1701 from the first terminal device are encrypted by the first terminal device, where before the determining module 1702 determines, according to the DH public key of the second terminal device and the second random number, the first shared key of the second terminal device used for authentication with the second terminal device, the server further includes: a decryption module, configured to decrypt the encrypted DH public key of the second terminal device and the encrypted first ID of the second terminal device according to the second shared key, where the determining module 1702 is specifically configured to: determine, according to the decrypted DH public key of the second terminal device and the second random number, the first shared key of the second terminal device used for authentication with the second terminal device.

Optionally, before the sending module 1703 sends the second message to the first terminal device, the server further includes: an encryption module, configured to encrypt the DH public key of the server and the second ID of the second terminal device according to the second shared key, where the DH public key of the server and the second ID of the second terminal device that are in the second message sent by the sending module 1703 to the first terminal device are encrypted by the server.

Optionally, the server further includes a verification module, where the receiving module 1701 is further configured to: receive the second ID of the second terminal device sent by the second terminal device, and a message authentication code (MAC) that is generated by the second terminal device for the second ID of the second terminal device;

the verification module is configured to verify the MAC of the second ID of the second terminal device according to the first shared key; and the sending module 1703 is further configured to: if the verification module verifies the MAC of the second ID of the second terminal device, send, to the second terminal device, a provision complete message, and a MAC of the provision complete message that is generated by the server for the provision complete message.

The server 1700 according to this embodiment of this application may correspond to the server in the authentication methods according to the embodiments of this application in FIG. 7 to FIG. 11, and modules in the server 1700 and the foregoing other operations and/or functions are respectively used to implement corresponding processes of the methods in FIG. 7 to FIG. 11. For brevity, details are not described herein again.

Therefore, the server according to this embodiment of this application can provide, for a terminal device not having a credential pre-issued by an operator and in a DH key exchange manner by using a terminal device holding a credential, a shared key used for authentication with an operator network, thereby enabling the terminal device not having a credential pre-issued by the operator to access the network.

Figure 18:
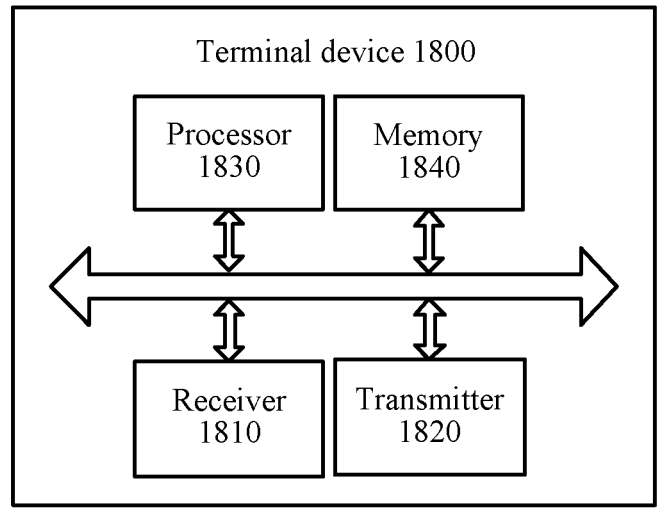
FIG. 18 is another schematic block diagram of a terminal device according to an embodiment of this application.

FIG. 18 is another schematic block diagram of a terminal device 1800 according to an embodiment of this application. The terminal device 1800 is the first terminal device in the foregoing method embodiments. As shown in FIG. 18, the terminal device 1800 includes: a receiver 1810, a transmitter 1820, a processor 1830, and a memory 1840. The receiver 1810 and the transmitter 1820 may be collectively referred to as a transceiver. The receiver 1810, the transmitter 1820, the processor 1830, and the memory 1840 are connected to each other by using an internal connection path, the memory 1840 is configured to store an instruction, and the processor 1830 is configured to execute the instruction stored in the memory 1840, so as to control the receiver 1810 to receive a signal and control the transmitter 1820 to send a signal.

The receiver 1810 is configured to receive a Diffie-Hellman (DH) public key and a first identity (ID) that are sent by at least one second terminal device, where the at least one second terminal device is a device not holding a shared key.

The transmitter 1820 is configured to send a first message to a server, where the first message includes a DH public key of each second terminal device of the at least one second terminal device and a first ID of the second terminal device.

The receiver 1810 is further configured to receive a second message that is sent by the server based on the first message, where the second message includes a DH public key of the server and a second ID of the second terminal device that is generated by the server for the second terminal device, and the second ID is used to identify a subscription user.

The transmitter 1820 is further configured to send the second ID of the second terminal device and the DH public key of the server to the second terminal device, so that the second terminal device determines, according to the second ID of the second terminal device and the DH public key of the server, a first shared key of the second terminal device and the second ID of the second terminal device that are used for authentication with the server.

The terminal device 1800 according to this embodiment of this application may correspond to the first terminal device in the mobile network authentication methods according to the embodiments of this application shown in FIG. 7 to FIG. 11, and the terminal device 1500 according to the embodiments of this application, and modules in the terminal device 1800 and the foregoing other operations and/or functions are used to implement corresponding processes of the methods in FIG. 7 to FIG. 11. For brevity, details are not described herein again.

Figure 19:
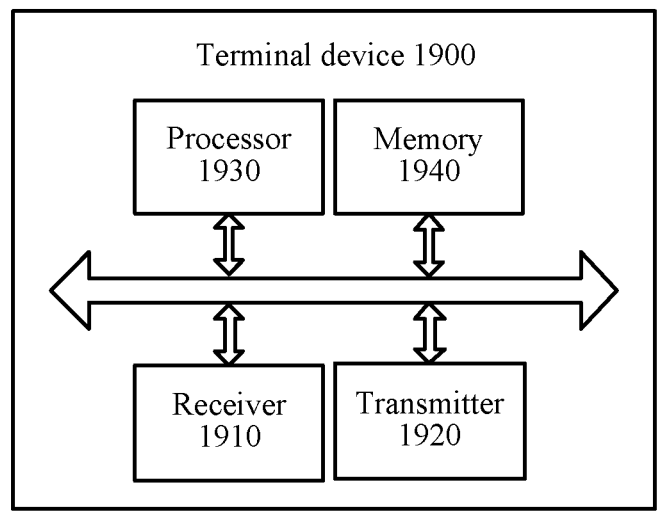
FIG. 19 is another schematic block diagram of a terminal device according to an embodiment of this application.

FIG. 19 is another schematic block diagram of a terminal device 1900 according to an embodiment of this application. The terminal device 1900 is the second terminal device in the foregoing method embodiments. As shown in FIG. 19, the terminal device 1900 includes: a receiver 1910, a transmitter 1920, a processor 1930, and a memory 1940. The receiver 1910 and the transmitter 1920 may be collectively referred to as a transceiver. The receiver 1910, the transmitter 1920, the processor 1930, and the memory 1940 are connected to each other by using an internal connection path, the memory 1940 is configured to store an instruction, and the processor 1930 is configured to execute the instruction stored in the memory 1940, so as to control the receiver 1910 to receive a signal and control the transmitter 1920 to send a signal.

The processor 1930 is configured to determine a Diffie-Hellman (DH) public key of the second terminal device according to a first random number.

The transmitter 1920 is configured to send a first message to a first terminal device, where the first message includes the DH public key of the second terminal device and a first identity (ID) of the second terminal device, and the first terminal device is a device holding a shared key.

The receiver 1910 is configured to receive a second message that is sent by the first terminal device based on the first message, where the second message includes a DH public key of a server, and a second ID that is generated by the server for the second terminal device, and the second ID is used to identify a subscription user.

The processor 1930 is further configured to determine a first shared key according to the first random number and the DH public key of the server; and perform mutual authentication with the server according to the first shared key and the second ID.

The terminal device 1900 according to this embodiment of this application may correspond to the second terminal device in the mobile network authentication methods according to the embodiments of this application shown in FIG. 7 to FIG. 11, and the terminal device 1600 according to the embodiments of this application, and modules in the terminal device 1900 and the foregoing other operations and/or functions are used to implement corresponding processes of the methods in FIG. 7 to FIG. 11. For brevity, details are not described herein again.

Figure 20:
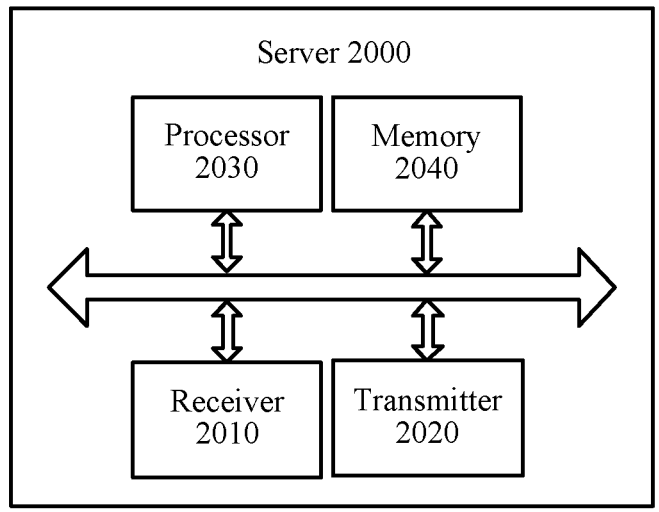
FIG. 20 is another schematic block diagram of a server according to an embodiment of this application.

FIG. 20 is another schematic block diagram of a server 2000 according to an embodiment of this application. The server 2000 is the second terminal device in the foregoing method embodiments. As shown in FIG. 20, the server 2000 includes: a receiver 2010, a transmitter 2020, a processor 2030, and a memory 2040. The receiver 2010 and the transmitter 2020 may be collectively referred to as a transceiver. The receiver 2010, the transmitter 2020, the processor 2030, and the memory 2040 are connected to each other by using an internal connection path, the memory 2040 is configured to store an instruction, and the processor 2030 is configured to execute the instruction stored in the memory 2040, so as to control the receiver 2010 to receive a signal and control the transmitter 2020 to send a signal.

The receiver 2010 is configured to receive a first message sent by the first terminal device, where the first message includes a DH public key of each second terminal device of at least one second terminal device and a first ID of the second terminal device that are received by the first terminal device from the second terminal device, the first terminal device is a device holding a shared key, and the at least one second terminal device is a device not holding a shared key.

The processor 2030 is configured to: determine a DH public key of the server according to a second random number and generate a second ID of the second terminal device for the second terminal device, where the second ID is used to identify a subscription user; and determine, according to the DH public key of the second terminal device and the second random number, a first shared key of the second terminal device used for authentication with the second terminal device.

The transmitter 2020 is configured to send a second message to the first terminal device, where the second message includes the DH public key of the server and the second ID of the second terminal device.

The server 2000 according to this embodiment of this application may correspond to the server in the mobile network authentication methods according to the embodiments of this application shown in FIG. 7 to FIG. 11, and the server 1700 according to the embodiments of this application, and modules in the server 2000 and the foregoing other operations and/or functions are used to implement corresponding processes of the methods in FIG. 7 to FIG. 11. For brevity, details are not described herein again.

Figure 21:
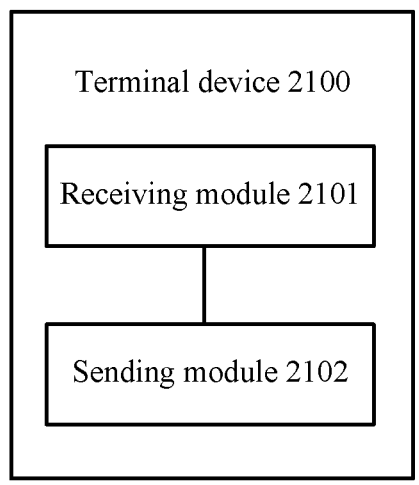
FIG. 21 is a schematic block diagram of a terminal device according to another embodiment of this application.

FIG. 21 is a schematic block diagram of a terminal device 2100 according to another embodiment of this application. As shown in FIG. 21, the terminal device 2100 is the first terminal device in the foregoing method embodiment of FIG. 13, the first terminal device is a device holding a shared key, and the first terminal device 2100 includes a receiving module 2101 and a sending module 2102.

The receiving module 2101 is configured to receive a Diffie-Hellman (DH) public key and a first identity (ID) that are sent by at least one second terminal device, where the at least one second terminal device is a device not holding a shared key.

The sending module 2102 is configured to send an attach request message to a network authentication entity, where the attach request message includes a first message and an identity ID of the first terminal device, and the first message includes a DH public key of each second terminal device of the at least one second terminal device and a first ID of the second terminal device.

The receiving module 2101 is further configured to receive a user authentication request message that is sent by the network authentication entity based on the attach request message, where the user authentication request message includes a second message and authentication data, the second message includes a DH public key of a server and a second ID of the second terminal device that is generated by the server for the second terminal device, and the second ID is used to identify a subscription user.

The sending module 2102 is further configured to send the DH public key of the server and the second ID of the second terminal device to the second terminal device, so that the second terminal device determines, according to the second ID of the second terminal device and the DH public key of the server, a first shared key of the second terminal device and the second ID of the second terminal device that are used for authentication with the server.

Therefore, the terminal device according to this embodiment of this application can establish, in a process of performing authentication with an operator network according to a credential held by the terminal device, a channel for key negotiation between a terminal device not holding a credential pre-issued by the operator and the server, so that the terminal device not having a credential pre-issued by the operator can also obtain, from the server, a shared key used for authentication with the operator network, thereby accessing the network.

Optionally, the receiving module 2101 is further configured to: receive the second ID of the second terminal device sent by the second terminal device, and a message authentication code (MAC) that is generated by the second terminal device for the second ID of the second terminal device;

the sending module 2102 is further configured to send the second ID of the second terminal device and the MAC of the second ID of the second terminal device to the network authentication entity;

the receiving module 2101 is further configured to receive a provision complete message that is sent by the network authentication entity based on the second ID of the second terminal device and the MAC of the second ID of the second terminal device; and the sending module 2102 is further configured to send the provision complete message to the second terminal device.

Optionally, the sending module 2102 is further configured to: send a user authentication response message to the network authentication entity based on the user authentication request message; and the receiving module 2101 is further configured to receive an authentication success message that is sent by the network authentication entity based on the authentication response message.

Optionally, the server includes a home subscriber server (HSS).

Optionally, the network authentication entity includes a mobility management entity MME.

The terminal device 2100 according to this embodiment of this application may correspond to the first terminal device in the authentication method according to the embodiment of this application in FIG. 13, and modules in the terminal device 2100 and the foregoing other operations and/or functions are respectively used to implement corresponding processes of the method in FIG. 13. For brevity, details are not described herein again.

Figure 22:
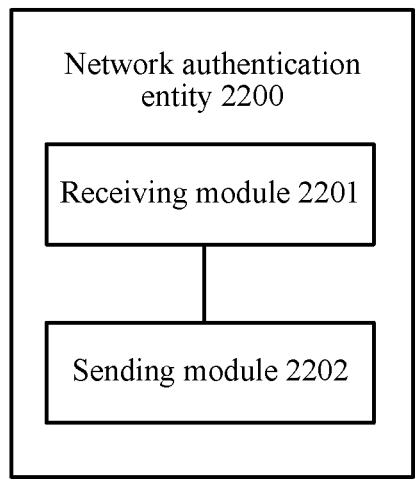
FIG. 22 is a schematic block diagram of a network authentication entity according to another embodiment of this application.

FIG. 22 is a schematic block diagram of a network authentication entity 2200 according to another embodiment of this application. As shown in FIG. 22, the network authentication entity 2200 is the network authentication entity in the foregoing method embodiment of FIG. 13, and the network authentication entity 2200 includes a receiving module 2201 and a sending module 2202.

The receiving module 2201 is configured to receive an attach request message sent by a first terminal device, where the attach request message includes a first message and an identity (ID) of the first terminal device, the first message includes a DH public key of each second terminal device of at least one second terminal device and a first ID of the second terminal device, the first terminal device is a device holding a shared key, and the at least one second terminal device is a device not holding a shared key.

The sending module 2202 is configured to send an authentication data request message to a server according to the attach request message.

The receiving module 2201 is further configured to receive an authentication data response message that is sent by the server based on the authentication data request message, where the authentication data response message includes a second message and an authentication vector, the second message includes a DH public key of the server and a second ID of the second terminal device that is generated by the server for the second terminal device, and the second ID is used to identify a subscription user.

The sending module 2202 is further configured to send the second message and authentication data in the authentication vector to the first terminal device, so that the first terminal device sends the DH public key of the server and the second ID of the second terminal device to the second terminal device.

Therefore, in this embodiment of this application, the network authentication entity can provide, in a process of authenticating a terminal device holding a credential, a channel for key negotiation between a terminal device not holding a credential pre-issued by an operator and the server for the terminal device not holding a credential pre-issued by the operator, so that the terminal device not having a credential pre-issued by the operator can also obtain, from the server, a shared key used for authentication with an operator network, thereby accessing the network.

Optionally, the receiving module 2201 is further configured to: receive the second ID of the second terminal device that is sent by the first terminal device, a message authentication code (MAC) that is generated by the second terminal device for the second ID of the second terminal device, and a user authentication response message that is sent by the first terminal device based on a user authentication request message;

the sending module 2202 is further configured to send the second ID of the second terminal device and the MAC of the second ID of the second terminal device to the server;

the receiving module 2201 is further configured to receive a provision complete message that is sent by the server based on the second ID of the second terminal device and the MAC of the second ID of the second terminal device; and the sending module 2202 is further configured to send, according to the user authentication response message, an authentication success message to the first terminal device, and send the provision complete message to the first terminal device, so that the first terminal device sends the provision complete message to the second terminal device.

The network authentication entity 2200 according to this embodiment of this application may correspond to the network authentication entity in the authentication method according to the embodiment of this application in FIG. 13, and modules in the network authentication entity 2200 and the foregoing other operations and/or functions are used to implement corresponding processes of the method in FIG. 13. For brevity, details are not described herein again.

Figure 23:
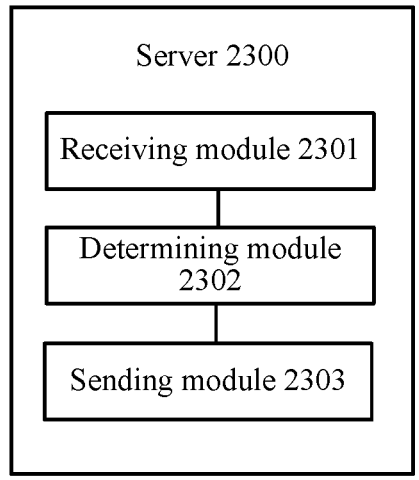
FIG. 23 is a schematic block diagram of a server according to another embodiment of this application.

FIG. 23 is a schematic block diagram of a server 2300 according to another embodiment of this application. As shown in FIG. 23, the server 2300 is the server in the foregoing method embodiment of FIG. 13, and the server 2300 includes a receiving module 2301, a determining module 2302, and a sending module 2303.

The receiving module 2301 is configured to receive an authentication data request message sent by a network authentication entity, where the authentication data request message includes a first message and an identity (ID) of a first terminal device, the first message includes a DH public key of each second terminal device of at least one second terminal device and a first ID of the second terminal device, and the at least one second terminal device is a device not holding a shared key.

The determining module 2302 is configured to determine a DH public key of the server and generate a second ID of the second terminal device for the second terminal device, where the second ID is used to identify a subscription user; and determine an authentication vector based on the authentication data request message.

The sending module 2303 is configured to send a user authentication response message to the network authentication entity, where the user authentication response message includes a second message and the authentication vector, and the second message includes the DH public key of the server and the second ID of the second terminal device.

Therefore, the server according to this embodiment of this application can provide, for a terminal device not having a credential pre-issued by an operator, in a DH key exchange manner, and in a process of performing authentication with a terminal device holding a credential, a shared key used for authentication with an operator network, thereby enabling the terminal device not having a credential pre-issued by the operator to access the network.

Optionally, the server further includes a verification module, where the receiving module 2301 is configured to: receive the second ID of the second terminal device sent by the network authentication entity, and a message authentication code MAC that is generated by the second terminal device for the second ID of the second terminal device;

the verification module is configured to verify the MAC of the second ID of the second terminal device according to a first shared key; and the sending module is configured to: if the verification module verifies the MAC of the second ID of the second terminal device, send a provision complete message to the network authentication entity.

The server 2300 according to this embodiment of this application may correspond to the server in the authentication method according to the embodiment of this application in FIG. 13, and modules in the server 2300 and the foregoing other operations and/or functions are used to implement corresponding processes of the method in FIG. 13. For brevity, details are not described herein again.

Figure 24:
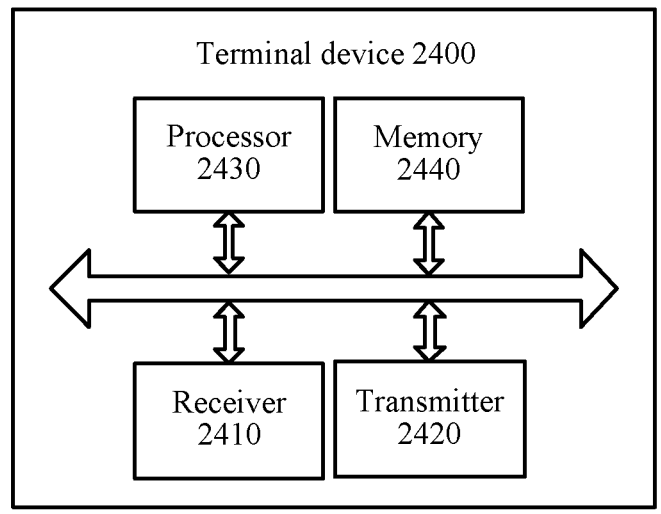
FIG. 24 is another schematic block diagram of a terminal device according to another embodiment of this application.

FIG. 24 is another schematic block diagram of a terminal device 2400 according to another embodiment of this application. The terminal device 2400 is the first terminal device in the foregoing method embodiment of FIG. 13. As shown in FIG. 24, the terminal device 2400 includes: a receiver 2410, a transmitter 2420, a processor 2430, and a memory 2440. The receiver 1810 and the transmitter 1820 may be collectively referred to as a transceiver. The receiver 2410, the transmitter 2420, the processor 2430, and the memory 2440 are connected to each other by using an internal connection path, the memory 2440 is configured to store an instruction, and the processor 2430 is configured to execute the instruction stored in the memory 2440, so as to control the receiver 2410 to receive a signal and control the transmitter 2420 to send a signal.

The receiver 2410 is configured to receive a Diffie-Hellman (DH) public key and a first identity (ID) that are sent by at least one second terminal device, where the at least one second terminal device is a device not holding a shared key.

The transmitter 2420 is configured to send an attach request message to a network authentication entity, where the attach request message includes a first message and an identity ID of the first terminal device, and the first message includes a DH public key of each second terminal device of the at least one second terminal device and a first ID of the second terminal device.

The receiver 2410 is further configured to receive a user authentication request message that is sent by the network authentication entity based on the attach request message, where the user authentication request message includes a second message and authentication data, the second message includes a DH public key of a server and a second ID of the second terminal device that is generated by the server for the second terminal device, and the second ID is used to identify a subscription user.

The transmitter 2420 is further configured to send the DH public key of the server and the second ID of the second terminal device to the second terminal device, so that the second terminal device determines, according to the second ID of the second terminal device and the DH public key of the server, a first shared key of the second terminal device and the second ID of the second terminal device that are used for authentication with the server.

The terminal device 2400 according to this embodiment of this application may correspond to the first terminal device in the mobile network authentication method according to the embodiment of this application shown in FIG. 13, and the terminal device 2100 according to the embodiments of this application, and modules in the terminal device 2400 and the foregoing other operations and/or functions are used to implement corresponding processes of the method in FIG. 13. For brevity, details are not described herein again.

Figure 25:
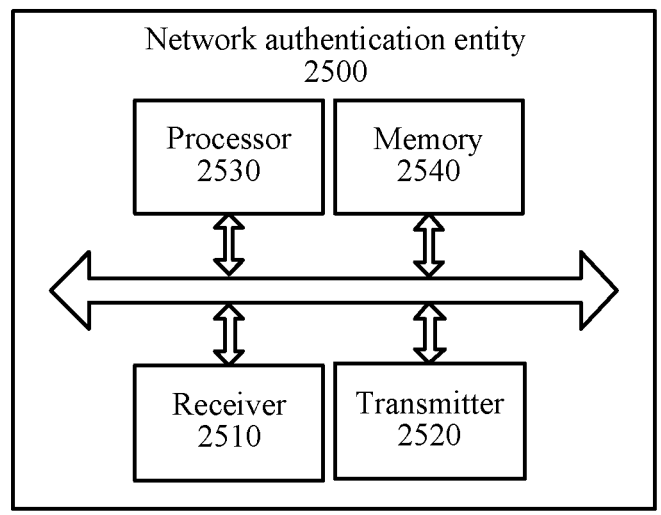
FIG. 25 is another schematic block diagram of a network authentication entity according to another embodiment of this application.

FIG. 25 is another schematic block diagram of a network authentication entity 2500 according to another embodiment of this application. The network authentication entity 2500 is the network authentication entity in the foregoing method embodiment of FIG. 13. As shown in FIG. 25, the network authentication entity 2500 includes: a receiver 2510, a transmitter 2520, a processor 2530, and a memory 2540. The receiver 2510 and the transmitter 2520 may be collectively referred to as a transceiver. The receiver 2510, the transmitter 2520, the processor 2530, and the memory 2540 are connected to each other by using an internal connection path, the memory 2540 is configured to store an instruction, and the processor 2530 is configured to execute the instruction stored in the memory 2540, so as to control the receiver 2510 to receive a signal and control the transmitter 2520 to send a signal.

The receiver 2510 is configured to receive an attach request message sent by a first terminal device, where the attach request message includes a first message and an identity (ID) of the first terminal device, the first message includes a DH public key of each second terminal device of at least one second terminal device and a first ID of the second terminal device, the first terminal device is a device holding a shared key, and the at least one second terminal device is a device not holding a shared key.

The transmitter 2520 is configured to send an authentication data request message to a server according to the attach request message.

The receiver 2510 is further configured to receive an authentication data response message that is sent by the server based on the authentication data request message, where the authentication data response message includes a second message and an authentication vector, the second message includes a DH public key of the server and a second ID of the second terminal device that is generated by the server for the second terminal device, and the second ID is used to identify a subscription user.

The transmitter 2520 is further configured to send the second message and authentication data in the authentication vector to the first terminal device, so that the first terminal device sends the DH public key of the server and the second ID of the second terminal device to the second terminal device.

The network authentication entity 2500 according to this embodiment of this application may correspond to the first terminal device in the mobile network authentication method according to the embodiment of this application shown in FIG. 13, and the network authentication entity 2200 according to the embodiments of this application, and modules in the network authentication entity 2500 and the foregoing other operations and/or functions are used to implement corresponding processes of the method in FIG. 13. For brevity, details are not described herein again.

Figure 26:
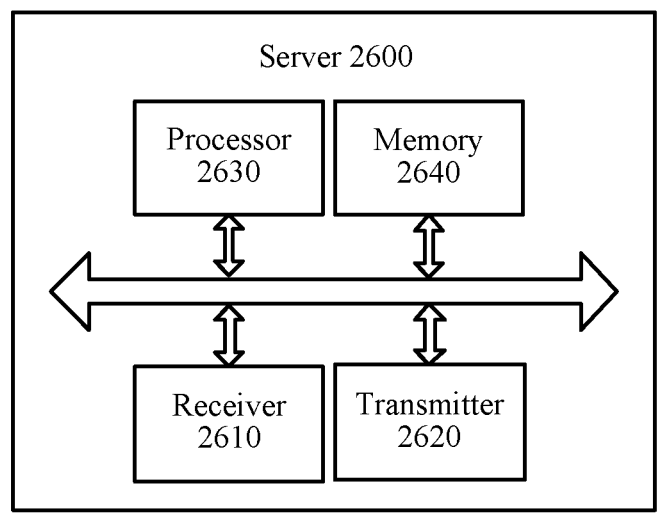
FIG. 26 is another schematic block diagram of a server according to another embodiment of this application.

FIG. 26 is another schematic block diagram of a server 2600 according to another embodiment of this application. The server 2600 is the server in the foregoing method embodiments. As shown in FIG. 26, the server 2600 includes: a receiver 2610, a transmitter 2620, a processor 2630, and a memory 2640. The receiver 2610 and the transmitter 2620 may be collectively referred to as a transceiver. The receiver 2610, the transmitter 2620, the processor 2630, and the memory 2640 are connected to each other by using an internal connection path, the memory 2640 is configured to store an instruction, and the processor 2630 is configured to execute the instruction stored in the memory 2640, so as to control the receiver 2610 to receive a signal and control the transmitter 2620 to send a signal.

The receiver 2610 is configured to receive an authentication data request message sent by a network authentication entity, where the authentication data request message includes a first message and an identity (ID) of a first terminal device, the first message includes a DH public key of each second terminal device of at least one second terminal device and a first ID of the second terminal device, and the at least one second terminal device is a device not holding a shared key.

The processor 2630 is configured to determine a DH public key of the server and generate a second ID of the second terminal device for the second terminal device, where the second ID is used to identify a subscription user; and determine an authentication vector based on the authentication data request message.

The transmitter 2620 is configured to send a user authentication response message to the network authentication entity, where the user authentication response message includes a second message and the authentication vector, and the second message includes the DH public key of the server and the second ID of the second terminal device.

The server 2600 according to this embodiment of this application may correspond to the server in the mobile network authentication method according to the embodiment of this application shown in FIG. 13, and the server 2300 according to the embodiments of this application, and modules in the server 2600 and the foregoing other operations and/or functions are used to implement corresponding processes of the method in FIG. 13. For brevity, details are not described herein again.

It may be understood that, the processor in this embodiment of this application may be an integrated circuit chip, and has a signal processing capability. In an implementation process, steps in the foregoing method embodiments can be implemented by using a hardware integrated logical circuit in the processor, or by using instructions in a form of software. The processor may be a general purpose processor, a digital signal processor (, DSP), an application-specific integrated circuit (ASIC), a field programmable gate array (FPGA) or another programmable logical device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by means of a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (, DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should further be understood that determining B according to A does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A mobile network authentication method, wherein the method comprises:
   receiving, by a first terminal device, a Diffie-Hellman (DH) public key and a first identity (ID) that are sent by a second terminal device, wherein the first terminal device is a device holding a shared key, and the second terminal device is a device not holding the shared key;
   sending, by the first terminal device, a first message to a server, wherein the first message comprises the DH public key of the second terminal device and the first ID of the second terminal device;
   receiving, by the first terminal device, a second message that is sent by the server based on the first message, wherein the second message comprises a DH public key of the server and a second ID of the second terminal device that is generated by the server for the second terminal device, and the second ID is used to identify a subscription user; and
   sending, by the first terminal device, the second ID of the second terminal device and the DH public key of the server to the second terminal device, to enable the second terminal device to determine, according to the second ID of the second terminal device and the DH public key of the server, a first shared key of the second terminal device and the second ID of the second terminal device that are used for authentication with the server;

wherein before the sending, by the first terminal device, a first message to a server, the method further comprises:

encrypting, by the first terminal device, the DH public key of the second terminal device and the first ID of the second terminal device according to the second shared key, wherein the DH public key of the second terminal device and the first ID of the second terminal device that are in the first message sent by the first terminal device to the server are encrypted by the first terminal device.

2. The method according to claim 1, wherein the first message further comprises indication information, and the indication information is used to indicate that the first message is used to request the shared key of the second terminal device and the second ID of the second terminal device for the second terminal device.

3. The method according to claim 1, wherein before the sending, by the first terminal device, a first message to a server, the method further comprises:

generating, by the first terminal device, a message authentication code (MAC) of the first message for the first message according to a second shared key, wherein the second shared key is used for authentication between the first terminal device and the server, wherein the sending, by the first terminal device, a first message to a server comprises:

sending, by the first terminal device, the first message and the MAC of the first message to the server.

4. The method according to claim 1, wherein the receiving, by the first terminal device, a second message that is sent by the server based on the first message comprises:

receiving, by the first terminal device, the second message sent by the server, and a MAC of the second message generated by the server for the second message according to the second shared key, wherein the sending, by the first terminal device, the second ID of the second terminal device and the DH public key of the server to the second terminal device comprises:

verifying, by the first terminal device, the MAC of the second message according to the second shared key; and when the first terminal device verifies the MAC of the second message, sending, by the first terminal device, the second ID of the second terminal device and the DH public key of the server to the second terminal device.

5. The method according to claim 1, wherein the second ID of the second terminal device and the DH public key of the server that are in the second message received by the first terminal device from the server are encrypted by the server, wherein before the sending, by the first terminal device, the second ID of the second terminal device and the DH public key of the server to the second terminal device, the method further comprises:

decrypting, by the first terminal device, the encrypted second ID of the second terminal device and the encrypted DH public key of the server according to the second shared key; and the sending, by the first terminal device, the second ID of the second terminal device and the DH public key of the server to the second terminal device comprises:

sending, by the first terminal device, the decrypted second ID of the second terminal device and the decrypted DH public key of the server to the second terminal device.

6. A terminal device, wherein the terminal device is a first terminal device, the first terminal device is a device holding a shared key, and the first terminal device comprises a processor and a non-transitory processor-readable medium having processor-executable instructions stored thereon, the processor-executable instructions including a plurality of modules, the modules including:

a receiving module, configured to receive a Diffie-Hellman (DH) public key and a first identity (ID) that are sent by a second terminal device, wherein the second terminal device is a device not holding the shared key; and a sending module, configured to send a first message to a server, wherein the first message comprises the DH public key of the second terminal device and the first ID of the second terminal device, wherein the receiving module is further configured to receive a second message that is sent by the server based on the first message, wherein the second message comprises a DH public key of the server and a second ID of the second terminal device that is generated by the server for the second terminal device, and the second ID is used to identify a subscription user; and the sending module is further configured to send the second ID of the second terminal device and the DH public key of the server to the second terminal device, to enable the second terminal device to determine, according to the second ID of the second terminal device and the DH public key of the server, a first shared key of the second terminal device and the second ID of the second terminal device that are used for authentication with the server;

wherein the terminal device further comprises:

an encryption module, configured to, before the sending module sends the first message to the server, encrypt the DH public key of the second terminal device and the first ID of the second terminal device according to the second shared key, wherein the DH public key of the second terminal device and the first ID of the second terminal device that are in the first message sent by the sending module to the server are encrypted by the first terminal device.

7. The terminal device according to claim 6, wherein the first message further comprises indication information, and the indication information is used to indicate that the first message is used to request the shared key of the second terminal device and the second ID of the second terminal device for the second terminal device.

8. The terminal device according to claim 6, the first terminal device further comprises:

a generation module, configured to generate a message authentication code (MAC) of the first message for the first message according to a second shared key, wherein the second shared key is used for authentication between the first terminal device and the server, wherein the sending module is configured to:

send the first message and the MAC of the first message to the server.

9. The terminal device according to claim 6, wherein the receiving module is configured to:

receive the second message sent by the server, and a MAC of the second message generated by the server for the second message according to the second shared key, wherein the sending module is configured to:

verify, by the first terminal device, the MAC of the second message according to the second shared key; and when the first terminal device verifies the MAC of the second message, send, by the first terminal device, the second ID of the second terminal device and the DH public key of the server to the second terminal device.

10. The terminal device according claim 6, wherein the second ID of the second terminal device and the DH public key of the server that are in the second message received by the receiving module from the server are encrypted by the server, wherein the terminal device further comprises:

a decryption module, configured to, before the sending module sends the second ID of the second terminal device and the DH public key of the server to the second terminal device, decrypt the encrypted second ID of the second terminal device and the encrypted DH public key of the server according to the second shared key; and the sending module is configured to:

send the decrypted second ID of the second terminal device and the decrypted DH public key of the server to the second terminal device.

* * * * *